(12) United States Patent
Hernandez et al.

(10) Patent No.: US 9,438,685 B2
(45) Date of Patent: Sep. 6, 2016

(54) SYSTEM AND METHOD FOR DISPLAY OF USER RELATIONSHIPS CORRESPONDING TO NETWORK-ENABLED COMMUNICATIONS

(71) Applicant: WaveMarket, Inc., Emeryville, CA (US)

(72) Inventors: Sarah Hernandez, Berkeley, CA (US); Andrew Weiss, San Ramon, CA (US)

(73) Assignee: Location Labs, Inc., Emeryville, CA (US)

( * ) Notice: Subject to any disclaimer, the term of this patent is extended or adjusted under 35 U.S.C. 154(b) by 351 days.

(21) Appl. No.: 13/837,882

(22) Filed: Mar. 15, 2013

(65) Prior Publication Data

US 2014/0280553 A1    Sep. 18, 2014

(51) Int. Cl.
*H04L 29/08* (2006.01)
*H04W 4/02* (2009.01)

(52) U.S. Cl.
CPC .............. *H04L 67/22* (2013.01); *H04W 4/023* (2013.01); *H04L 29/08* (2013.01)

(58) Field of Classification Search
CPC ....... H04W 4/023; H04L 67/22; H04L 29/08
See application file for complete search history.

(56) References Cited

U.S. PATENT DOCUMENTS

| | | |
|---|---|---|
| 5,564,079 A | 10/1996 | Olsson |
| 5,833,479 A | 11/1998 | Talbot |
| 6,052,064 A | 4/2000 | Budnik et al. |
| 6,266,534 B1 | 7/2001 | Raith et al. |
| 6,496,701 B1 | 12/2002 | Chen et al. |
| 6,711,404 B1 | 3/2004 | Arpee et al. |
| 6,834,180 B1 | 12/2004 | Marshall |
| 6,856,805 B1 | 2/2005 | Raaf |
| 6,950,664 B2 | 9/2005 | Chen et al. |
| 7,366,759 B2 * | 4/2008 | Trevithick et al. ........... 709/206 |

(Continued)

FOREIGN PATENT DOCUMENTS

| | | |
|---|---|---|
| EP | 0982964 | 3/2000 |
| EP | 1175115 | 1/2002 |

(Continued)

OTHER PUBLICATIONS

C. Thompson, J. White, B. Dougherty, A. Albright and D.C. Smith, "Using Smartphones to Detect Car Accidents and Provide Situational Awareness to Emergency Responders" Third International Conference-Mobileware, Jun. 2010.

(Continued)

*Primary Examiner* — Patrice Winder
*Assistant Examiner* — Angela Widhalm de Rodriguez
(74) *Attorney, Agent, or Firm* — Dovas Law, P.C.

(57) ABSTRACT

A computer-implemented method of displaying indications of relationships of device users is provided. The method includes determining relationship strength between a first user and at least one other user wherein the relationship strength is determined based on a frequency of communication between the first user and the at least one other user. A first indication corresponding to the first user is displayed on a display of a device, and at least one other indication corresponding to the at least one other user is displayed on the display, wherein the at least one other indication is shown distanced from the first indication based on the determined relationship strength. A system for performing the method is further provided.

61 Claims, 16 Drawing Sheets

(56) References Cited

U.S. PATENT DOCUMENTS

| | | | |
|---|---|---|---|
| 7,606,772 B2 | 10/2009 | Flinn et al. | |
| 7,849,502 B1 | 12/2010 | Bloch et al. | |
| 7,869,792 B1 | 1/2011 | Zhou et al. | |
| 7,899,704 B1 | 3/2011 | Thompson | |
| 7,996,005 B2 | 8/2011 | Lotter et al. | |
| 8,073,907 B2 | 12/2011 | Roumeliotis et al. | |
| 8,145,240 B2 | 3/2012 | Roumeliotis et al. | |
| 8,185,953 B2 | 5/2012 | Rothstein et al. | |
| 8,229,421 B2 | 7/2012 | Hotes et al. | |
| 8,244,236 B2 | 8/2012 | Roumeliotis et al. | |
| 8,279,808 B2 | 10/2012 | Sing et al. | |
| 8,355,737 B2 | 1/2013 | MacNaughtan et al. | |
| 8,412,647 B2 | 4/2013 | Hotes et al. | |
| 8,661,123 B2 | 2/2014 | Nishiyama | |
| 8,682,995 B1* | 3/2014 | Lawler et al. | 709/207 |
| 8,825,759 B1* | 9/2014 | Jackson et al. | 709/204 |
| 8,935,245 B1* | 1/2015 | Cionca et al. | 707/732 |
| 2002/0049806 A1 | 4/2002 | Gatz et al. | |
| 2002/0101834 A1 | 8/2002 | Stanley | |
| 2003/0043941 A1 | 3/2003 | Johnson et al. | |
| 2003/0126267 A1 | 7/2003 | Gutta et al. | |
| 2004/0111479 A1 | 6/2004 | Borden et al. | |
| 2004/0116111 A1 | 6/2004 | Saunders | |
| 2004/0122681 A1* | 6/2004 | Ruvolo et al. | 705/1 |
| 2005/0195193 A1 | 9/2005 | Lehman | |
| 2005/0282540 A1 | 12/2005 | Motamedi et al. | |
| 2006/0019665 A1 | 1/2006 | Aghvami et al. | |
| 2006/0019679 A1 | 1/2006 | Rappaport et al. | |
| 2006/0200435 A1 | 9/2006 | Flinn et al. | |
| 2007/0277224 A1 | 11/2007 | Osborn et al. | |
| 2008/0005325 A1 | 1/2008 | Wynn et al. | |
| 2008/0066020 A1 | 3/2008 | Boss et al. | |
| 2008/0270038 A1 | 10/2008 | Partovi et al. | |
| 2009/0024747 A1* | 1/2009 | Moses et al. | 709/228 |
| 2009/0125499 A1 | 5/2009 | Cross et al. | |
| 2009/0260064 A1 | 10/2009 | McDowell et al. | |
| 2009/0327150 A1 | 12/2009 | Flake et al. | |
| 2010/0042684 A1 | 2/2010 | Broms et al. | |
| 2010/0077444 A1 | 3/2010 | Forristal | |
| 2010/0161369 A1* | 6/2010 | Farrell et al. | 705/8 |
| 2010/0211694 A1 | 8/2010 | Razmov et al. | |
| 2010/0246797 A1 | 9/2010 | Chavez et al. | |
| 2010/0306138 A1 | 12/2010 | Hotes et al. | |
| 2011/0047282 A1* | 2/2011 | Denman et al. | 709/231 |
| 2011/0078036 A1* | 3/2011 | Cummings et al. | 705/26.3 |
| 2011/0125844 A1 | 5/2011 | Collier et al. | |
| 2011/0218884 A1 | 9/2011 | Kothari et al. | |
| 2011/0289161 A1 | 11/2011 | Rankin et al. | |
| 2012/0047448 A1 | 2/2012 | Amidon et al. | |
| 2012/0047560 A1 | 2/2012 | Underwood et al. | |
| 2012/0102008 A1 | 4/2012 | Kaariainen et al. | |
| 2012/0151045 A1 | 6/2012 | Anakata et al. | |
| 2012/0151046 A1 | 6/2012 | Weiss et al. | |
| 2012/0151047 A1 | 6/2012 | Hodges et al. | |
| 2012/0180135 A1 | 7/2012 | Hodges et al. | |
| 2012/0201362 A1* | 8/2012 | Crossan et al. | 379/88.01 |
| 2012/0233256 A1* | 9/2012 | Shaham et al. | 709/204 |
| 2013/0141467 A1* | 6/2013 | Han et al. | 345/660 |
| 2013/0214925 A1 | 8/2013 | Weiss | |
| 2013/0282889 A1* | 10/2013 | Tito | 709/224 |
| 2014/0095630 A1* | 4/2014 | Wohlert et al. | 709/206 |
| 2014/0123043 A1* | 5/2014 | Schmidt et al. | 715/769 |
| 2014/0280530 A1* | 9/2014 | Fremlin et al. | 709/204 |

FOREIGN PATENT DOCUMENTS

| | | |
|---|---|---|
| WO | WO 9848578 | 10/1998 |
| WO | WO 02073997 | 9/2002 |

OTHER PUBLICATIONS

European search report dated Jul. 23, 2010 for PCT AU2006000348.

International search report dated Apr. 26, 2006 for PCT AU2006000348.

"Net Nanny Parental Controls User Guide", 2007, ContentWatch, Inc, http://www.netnanny.com/assets/documentation/nn/netnanny_56.pdf, pp. 53-60.

* cited by examiner

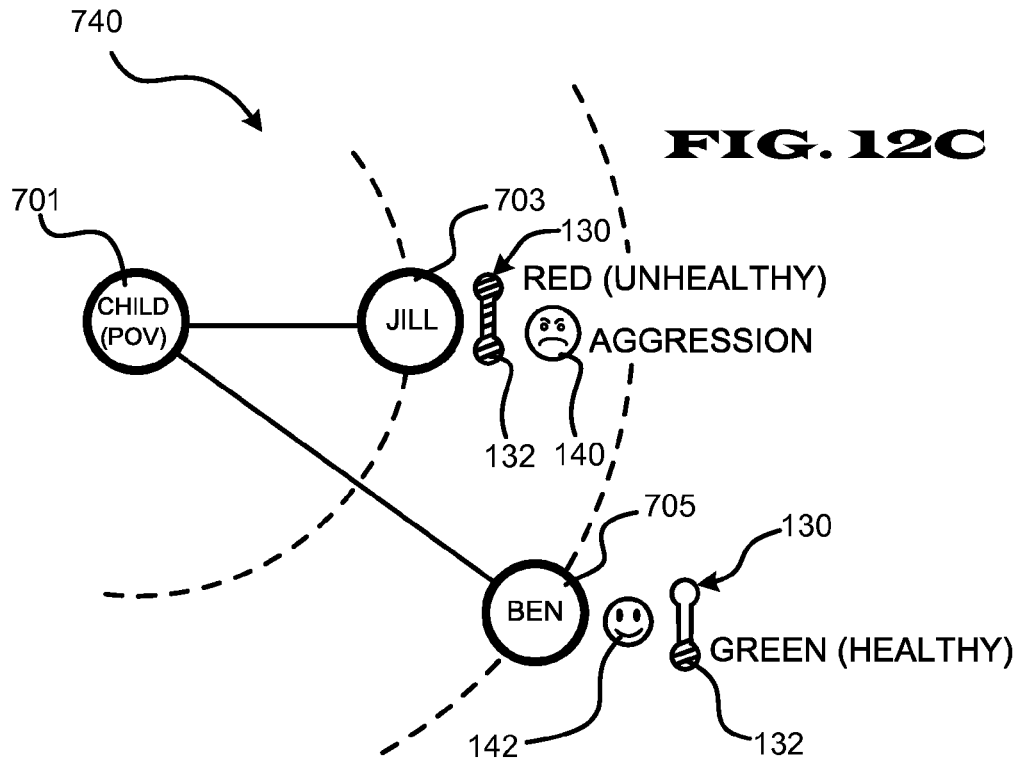
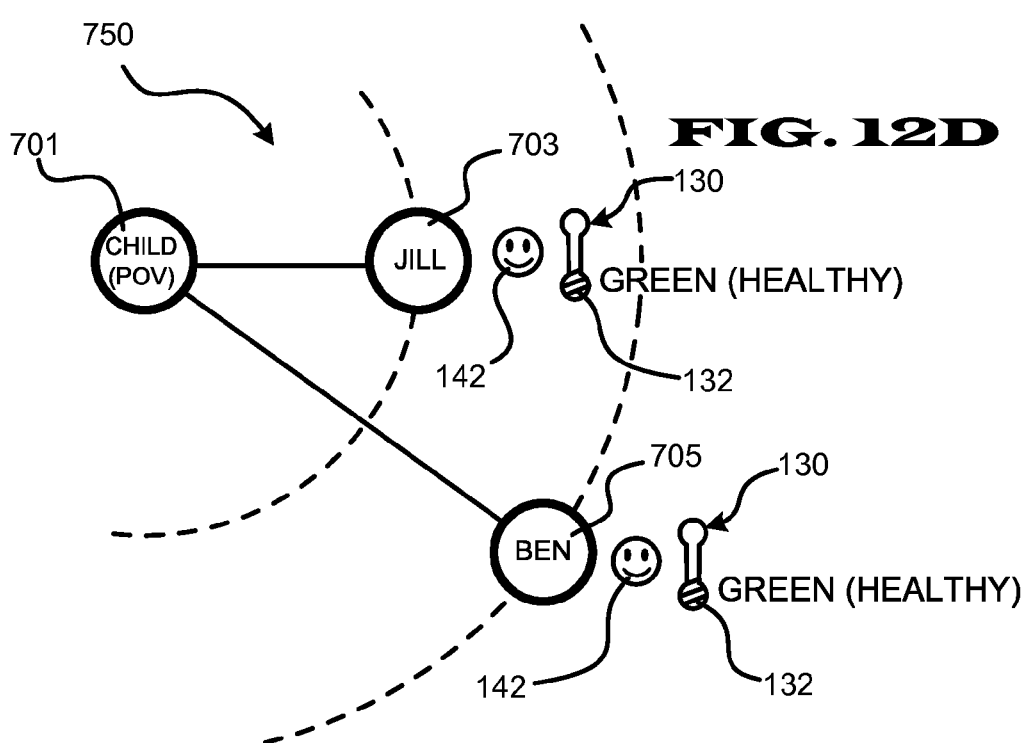

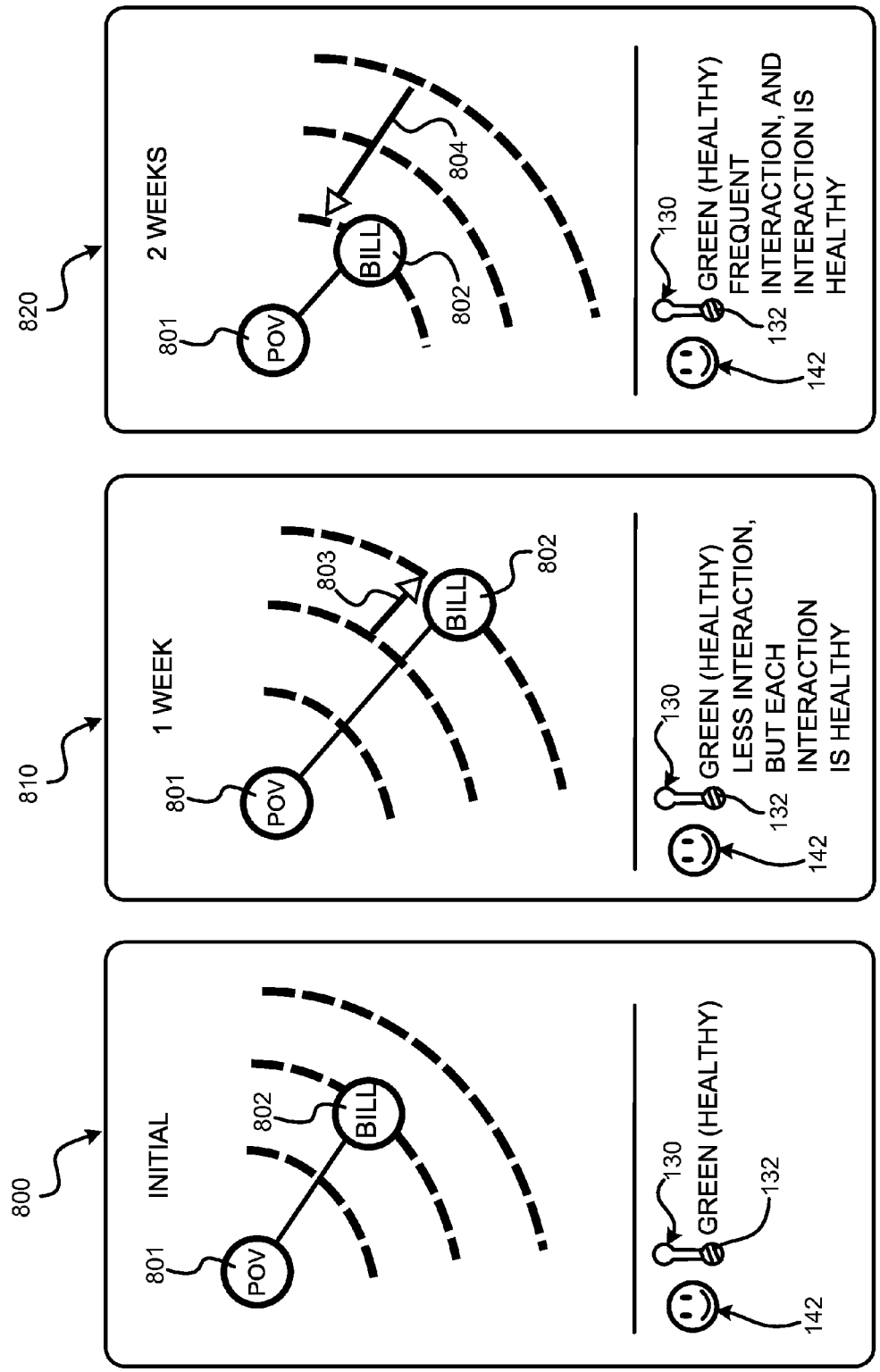

SYSTEM AND METHOD FOR DISPLAY OF USER RELATIONSHIPS CORRESPONDING TO NETWORK-ENABLED COMMUNICATIONS

BACKGROUND

As more social activity takes place in the virtual digital world, it has become more difficult for those tasked with supervising others to monitor the social activities of those under their care, especially children. For example, a child may establish and maintain social relationships via email, online chatting, online social networking and digital voice communications. Since these activities are generally private, it may be difficult for a parent or guardian to gain an understanding of their child's social interactions to determine who their child is in contact with and whether such relationships are healthy and beneficial to their child.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer-implemented method of displaying indications of relationships of device users is provided. The method includes determining relationship strength between a first user and at least one other user wherein the relationship strength is determined based on a frequency of communication between the first user and the at least one other user. A first indication corresponding to the first user is displayed on a display of a device, and at least one other indication corresponding to the at least one other user is displayed on the display, wherein the at least one other indication is shown distanced from the first indication based on the determined relationship strength.

A computing system comprising at least one non-transitory computer readable storage medium having encoded thereon instructions that, when executed by one or more processors of the system, cause the system to perform a process including determining relationship strength between a first user and at least one other user wherein the relationship strength is determined based on a frequency of communication between the first user and the at least one other user. A first indication corresponding to the first user is displayed on a display of a device, and at least one other indication corresponding to the at least one other user is displayed on the display, wherein the at least one other indication is shown distanced from the first indication based on the determined relationship strength.

Non-transitory computer-readable media tangibly embodying a program of instructions executable by at least one computing system to implement a method, the at least one computing system being capable of interfacing with a communications network, the method including determining relationship strength between a first user and at least one other user wherein the relationship strength is determined based on a frequency of communication between the first user and the at least one other user. A first indication corresponding to the first user is displayed on a display of a device, and at least one other indication corresponding to the at least one other user is displayed on the display, wherein the at least one other indication is shown distanced from the first indication based on the determined relationship strength.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

FIGS. 3, 4A-4C, and 5 are diagrams showing methods of determining relationship strength of device users.

Figure 6:
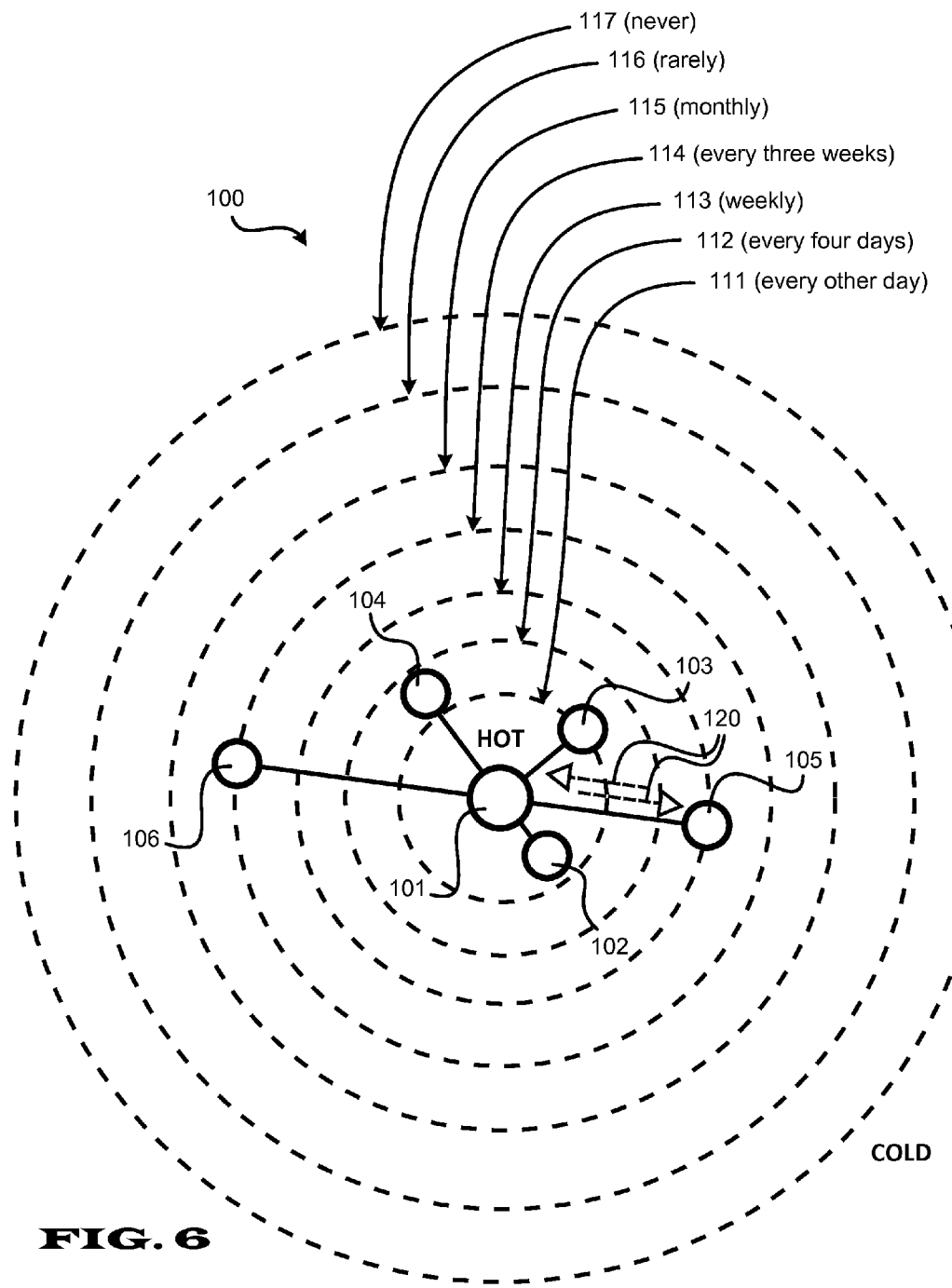

FIG. 6 is an example display including indications positioned based on relationship strength of device users.

Figure 7:
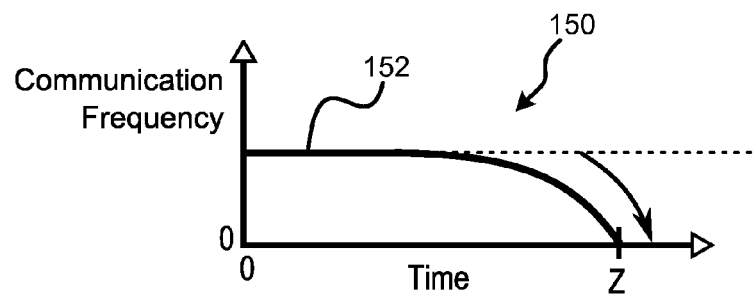

FIG. 7 shows an example graph of communication frequency versus time between device users.

Figure 8:
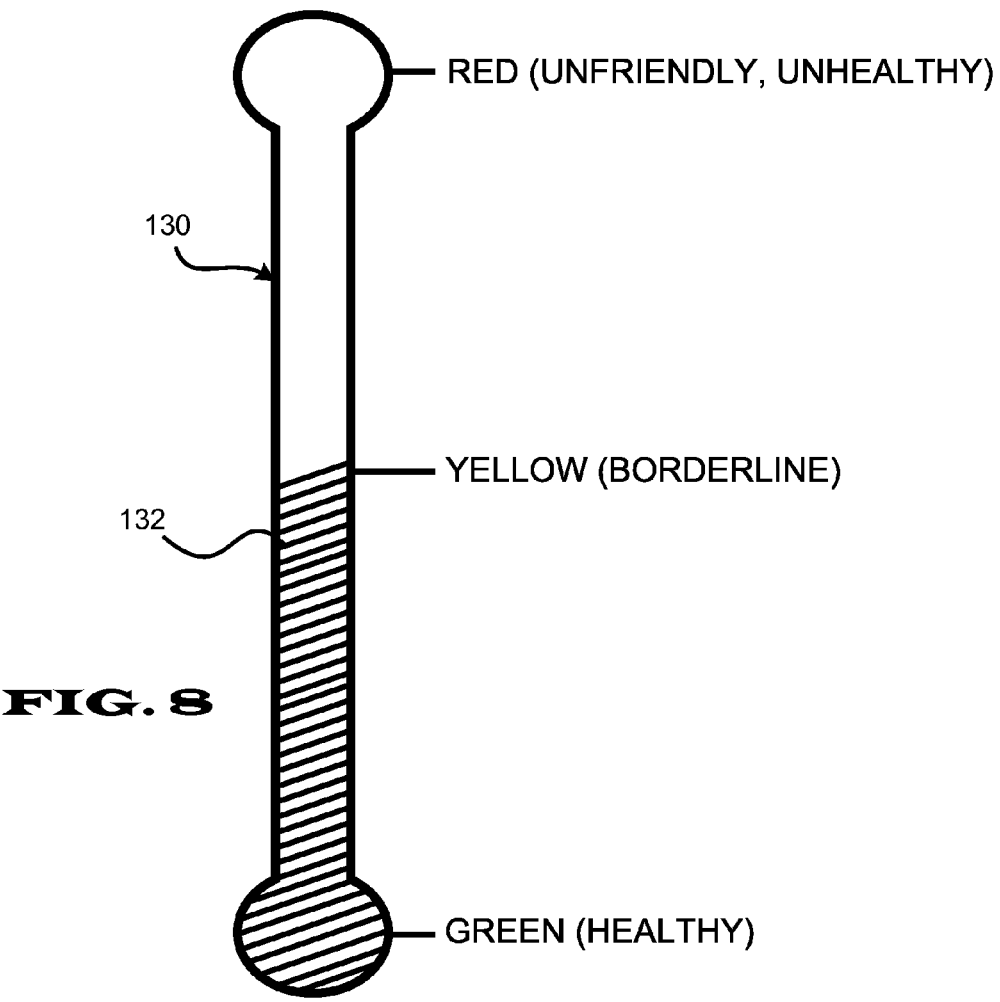

FIG. 8 shows an icon in the form of a relationship quality barometer.

FIGS. 9A-9C, 10A, 10B, 12A-12D, 13A-13C, 14A, and 14B show example screen displays including indications corresponding to relationships of device users.

Figure 11:
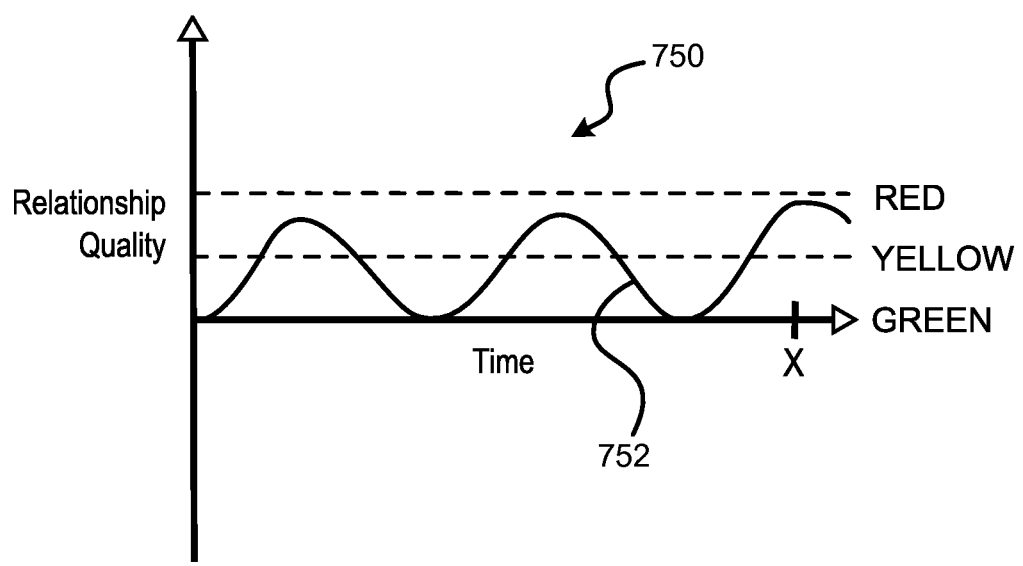

FIG. 11 shows an example plot of relationship quality versus time between device users.

DETAILED DESCRIPTION OF ILLUSTRATIVE EMBODIMENT(S)

Embodiments are described below with reference to the drawing figures where like numerals represent like elements throughout.

Described herein are methods and systems for determining and displaying relationship strength and relationship quality of device users based on communication frequencies and communication content. The methods and systems enable a monitoring user to visualize relationships between a monitored user, such as a child of the monitoring user, and those who the monitored user interacts with. A display can be provided to a monitoring user via a suitable device to provide insight into a monitored user's, friends, peers, enemies, occasionally friendly enemies or occasionally hostile friends ("frenemies"), bullying interactions, and other relationships based on data collected from various sources. Data sources can be local to monitored device or accessible via a network.

Figure 1:
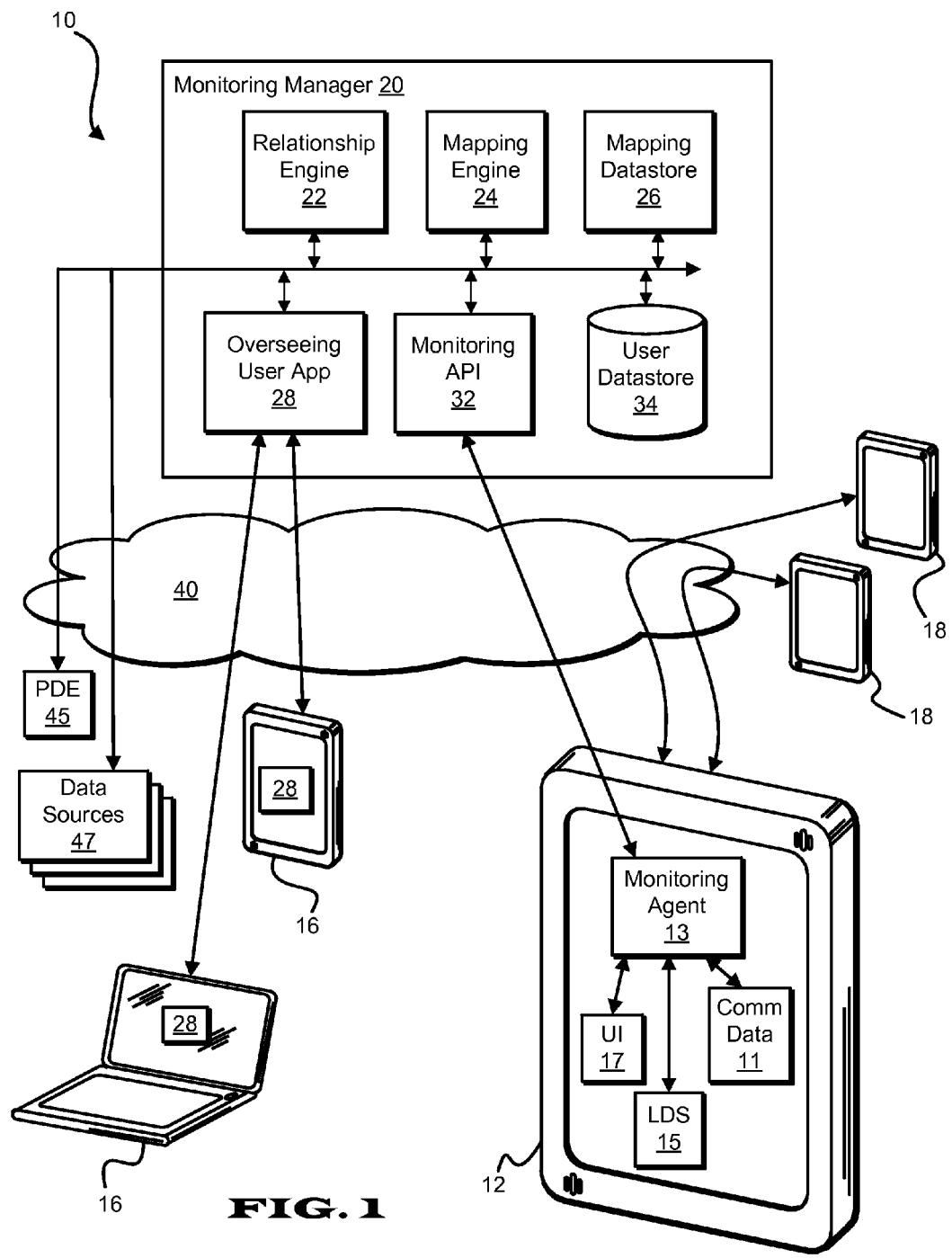
FIG. 1 shows a system for displaying indications corresponding to relationships of device users.

Referring to FIG. 1, an exemplary system 10 is provided including a monitoring manager 20 used for determining relationship strengths between device users. The monitoring manager 20 includes a relationship engine 22, a mapping engine 24, a mapping datastore 26, an overseeing user application 28, a monitoring application program interface ("API") 32, and a user datastore 34. The monitoring manager 20 can be implemented on one or more network-connectable computing systems and need not be implemented on a single system at a single location. The monitoring manager 20 is configured for communication via a network 40 with other network-connectable computing systems including one or more devices 12 (hereinafter "monitored device" or "monitored devices") corresponding to a monitored user and devices 16 (hereinafter "monitoring device" or "monitoring devices") corresponding to a monitoring user who configures the monitoring manager 20 and receives information regarding monitored devices 12. The monitored user can correspond for example to a child, and the monitoring user can correspond for example to a parent of the child who desires to monitor the child's relationships with other children.

Other device users may communicate with a monitored user with devices 18 via the monitored device 12 or via a network-enabled service (e.g. Facebook™ or Twitter™ social networking applications). The monitoring manager 20 or one or more components thereof can alternatively be executed on the monitored device 12 or other system. The overseeing user application 28 includes a web application or other application accessible to a monitoring device 16 via a network and/or installed and executed on the monitoring device 16.

The network 40 can include one or more wired or wireless networks, including for example the internet and wireless carrier systems. The devices 12, 16, 18 can include for example smartphones, laptop computers or other wired or wireless terminals preferably configured to operate on a wired or wireless telecommunication network. The operation of the monitoring manager 20 is described herein with respect to the devices 12, 16, 18. One skilled in the art will recognize that the monitoring manager 20 can operate with other suitable wired or wireless network-connectable computing systems.

Software and/or hardware residing on a monitored device 12 enables a monitoring agent 13 in the form of a client application which can provide location information to the monitoring manager 20 via the monitoring API 32. One or more of the devices 18 of other users may include a monitoring agent, but this is not required. In addition to components enabling data processing and wireless communication, the monitored device 12 includes a location determination system ("LDS") 15, including for example a global positioning system ("GPS") receiver or other location determining components, from which the monitoring agent 13 gathers data used for determining location of the monitored device 12. A monitored user operates the monitored device 12 with the monitoring agent 13 active. The term "user" as described herein refers to a device user, and does not indicate that such user necessarily uses the monitoring manager 20, the monitoring agent 12 or other systems enabled thereby. For example, other users of other devices 18 may not include a monitoring agent and may not be subject to direct monitoring by the monitoring manager.

The monitoring agent 13 and monitoring manager 20 are configured to monitor communications of a monitored user and others to retrieve data used for generating displays regarding user relationships. Data can be retrieved from a monitored device 12 or via a network accessible data source. Retrieved data can include information from a network-enabled social networking application such as Facebook™, for example tagged photos, friends lists, friending and unfriending actions, wall posts, comments or other user communications. Retrieved data can further include information from a network-enabled blogging application such as Twitter™, for example posts, threads, follow actions, and unfollow actions. Retrieved data can further include location data, which location data can be retrieved on demand, scheduled, or triggered by device usage (e.g. when a text message, telephone call, or other device use is performed). Retrieved data can further include monitored device use data, for example Short Message Service ("SMS") messages sent and received, Multimedia Message Service ("MMS") messages sent and received, and phone call records.

Figure 2:
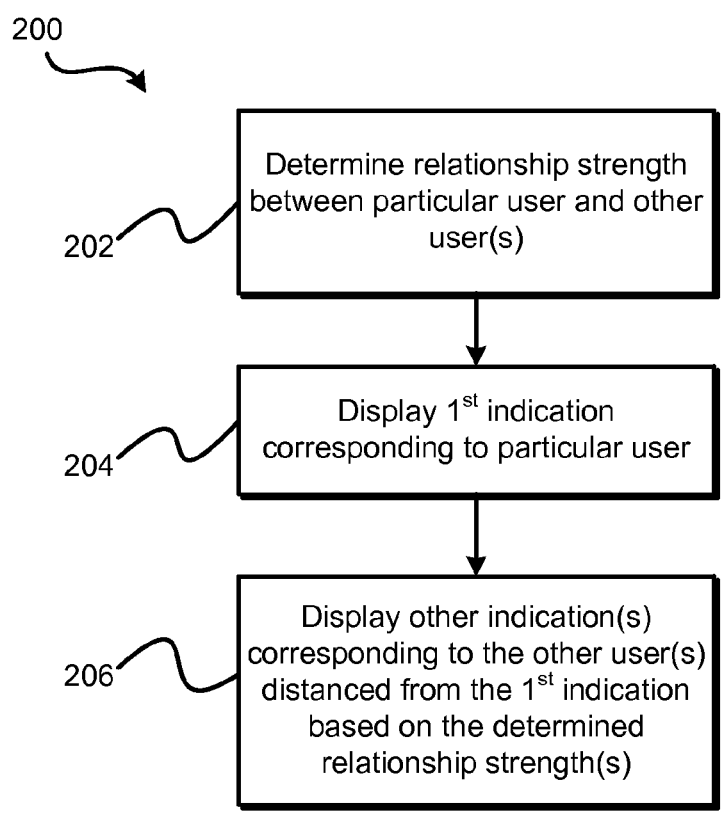
FIG. 2 is a diagram showing a method of displaying indications based on relationship strength of device users.

Referring to FIG. 2, a method 200 for displaying indications of relationships of device users is shown. The method 200 is described with reference to the components shown in the system 10 of FIG. 1, including the monitoring manager 20 and monitoring agent 13, which are preferably configured for performing the method 200 and include or have access to suitable non-transitory data storage including instructions for performing the method 200. The method 200 may alternatively be performed by the monitoring agent 13 alone, the monitoring manager 20 alone, or via other suitable systems and devices. The method 200 is not limited to the components shown in FIG. 1 which are merely exemplary.

In a step 202, relationship strength between a first user and one or more other users is determined, for example by one or both of the monitoring manager 20 via the relationship engine 22 and the monitoring agent 13. Referring to FIG. 1, the first user corresponds for example to a user of the monitored device 12, and the one or more other users correspond for example to users of one or more other devices 18. Relationship strength is determined based on frequency of communication between the first user and the one or more others users. Relationship strength can further be based on the topics of communications between users, the latency time between interactions, and other detectable aspects of communications between parties.

Frequency of communication can be determined in a number of ways, for example the number of communications in a day, a week or a month or in other suitable manner. Frequency of communication between the first user and another user can be determined via the monitoring agent 13 on the monitored device 12. Alternatively, frequency of communication can be determined via the monitoring manager 20 via query to a network-accessible data source 47, for example an application program interface enabled by a telecommunication carrier or other service provider on a server system. A first indication is displayed corresponding to the first user (step 204), and one or more other indications are displayed corresponding to one or more other users wherein the one or more other indications are shown distanced from the first indication based on the determined relationship strength (step 206). Each of the other users can correspond to its own indication. Alternatively, two or more other users can correspond to a single indication.

The steps of displaying the first indication corresponding to a first user (step 204) and displaying the one or more other indications corresponding to one or more other users (step 206) can be performed responsive to a request from a monitoring user, such as a parent, who monitors the first user ("monitored user"), such as the monitoring user's child, using the monitoring device 16 via the overseeing user application 28.

The other users using devices 18 can include for example friends or acquaintances of the monitored user. The communications of these other users are accessible by the monitoring agent 13 and the monitoring manager 20 to the extent that they are accessible to the monitored user of the monitored device 12.

Referring to FIG. 6, an example display 100 is shown pursuant to the method 200, for example enabled by the overseeing application 28 on a monitoring device 16. The monitored user of the monitored device 12 for example corresponds to a point of view ("POV") indication 101. Other users of other devices 18 are shown as other indications ("peer indications") 102, 103, 104, 105, 106. A particular peer indication can represent one user of one device 18 or a group of users of a plurality of devices 18. The size of a particular peer indication is dependent on the number of users represented thereby, the greater the number of users corresponding to a particular peer indication, the larger the particular peer indication.

Each peer indication 102-106 is spaced from the POV indication 101, based on a determined relationship strength between the user corresponding to the POV indication 101, in this case the monitored user, and the user or users corresponding to the particular peer indication 102-106. Relationship strength is determined based on communication frequency between the user corresponding to the POV indication 101 and the other users, wherein the more frequent the communication, the closer the peer indication is positioned to the POV indication 101. Alternatively, other criteria can be used for determining relationship strength between parties. Ringed demarcations 111-117 correspond to areas of different frequency of communication. The user corresponding to a POV indication can be changed from the monitoring user to one or more other users, for example responsive to a request of a monitoring user via the overseeing user application 28.

A first demarcation 111 corresponds to a communication every other day, wherein a particular peer indication positioned within the area defined by the first demarcation 111 denotes a frequency of communication between the monitored user and the user or users corresponding to the particular peer indication of greater than once every other day. A second demarcation 112 corresponds to a communication every four days, wherein a particular peer indication positioned within the area between the second demarcation 112 and the first demarcation 111 denotes a frequency of communication between the monitored user and the user or users corresponding to the particular peer indication of between once every other day and once every four days. A third demarcation 113 corresponds to a communication every week, a fourth demarcation 114 corresponds to a communication every three weeks, a fifth demarcation 115 corresponds to a communication every month, a sixth demarcation 116 corresponds to rare communications (e.g. once a year), and a seventh demarcation 117 corresponds to no communication within a time period during which monitoring has taken place.

Figure 3:
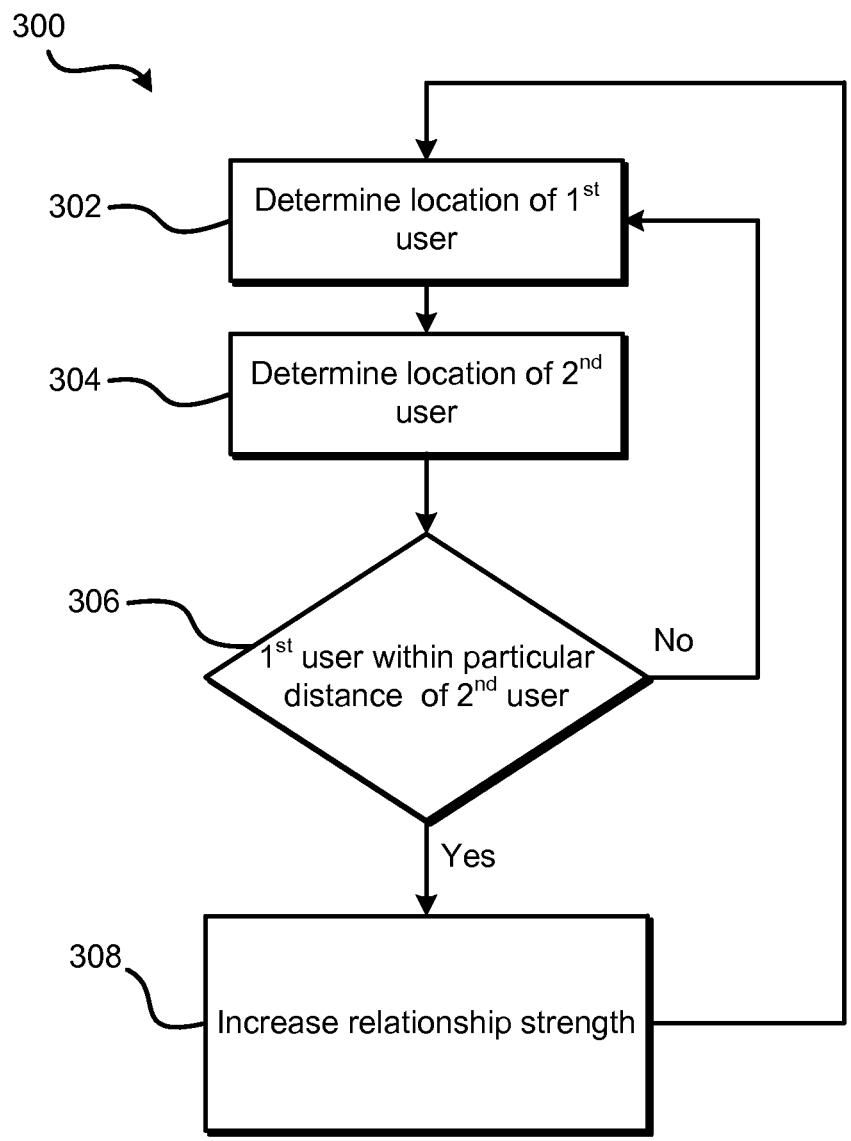

In addition to frequency of communication, relationship strength between two users can be determined based on proximity between the two users. Referring to FIG. 3, a method 300 for increasing the relationship strength determined based on geographic proximity is shown. Location of the first user is determined (step 302), and location of a second user is determined (step 304). The first user ("monitored user") corresponds for example to the monitored device 12 and the second user corresponds for example to another device 18. The location of the first user can be determined by the mapping engine 24 and/or monitoring agent 13 based on data from the LDS 15 on the monitored device 12. Alternatively, the location of the first user can be determined by the monitoring manager 20 based on data accessed from a position determining entity ("PDE") 45 enabled by a telecommunication carrier or other network-accessible data source 47. A monitoring user such as a parent may be able to authorize access to the monitored device 16 of their child or associated network-accessible data sources to permit determination of location. Such monitoring user may or may not be enabled to authorize the monitoring manager 20 to access location information of other devices 18 in communication with the monitored device, for example via a monitoring agent and location determining system ("LDS") on such other devices 18. The monitoring agent 13 or monitoring manager 20 can obtain location information of other devices 18 to the extent that the monitored user of the monitored device 12, has access to such location information, for example when rendered accessible to the monitored user by the other user. Based on such location information, it is determined in step 306 if the first user is within a particular distance of the second user (e.g. 400 meters, 1000 meters), for example using the mapping engine 24 and mapping datastore 26, and if so, the determined relationship strength is increased (step 308), and the location determining steps 302, 304 are repeated at suitable intervals.

The relationship strength between users can further depend on the relative position of one or more of the users to a particular location. Referring to FIG. 3, step 308, the increase in relationship strength can be less or eliminated entirely if one or both of the first and second users are located at or within a particular distance from a particular location at the time they are determined to be within a particular distance of each other. The particular location can include for example a school the first and second user are both required to attend. Since the first and second users are required to attend the school, their presence together at the school does not necessarily suggest a stronger relationship. A monitoring user can provide an indication of such particular location (e.g. school location) via the overseeing user application 28 to permit the monitoring manager 20 to determine the relationship strength between a monitored user and other users. Alternatively, the increase in relationship strength in step 308 can be higher when the particular location corresponds to a private location where the first and second users are not required to spend time. The monitoring manager 20 can receive indications of locations via the overseeing user application 28 to determine whether a particular location is a location at which attendance is required by a monitored user and other users. For example, a parent can provide the location of a school attended by their child for use by the relationship engine 22 in determining relationship strengths between the child and each of her peers.

Figure 4A:
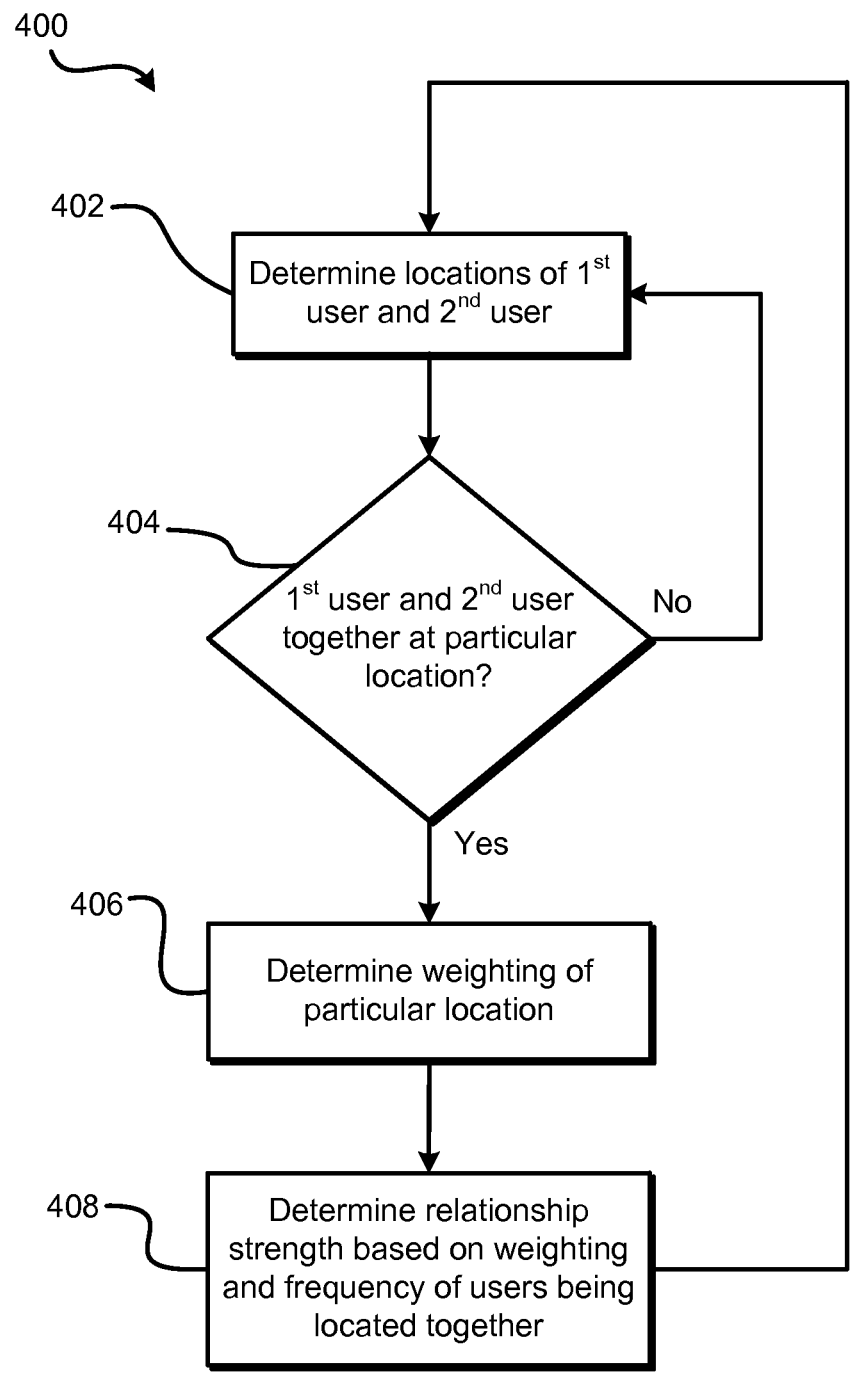

Referring to FIG. 4a, a method 400 for determining relationship strength is shown, which method is described with reference to the components shown in the exemplary system 10, but which method is not limited to such components. Locations of a first user and a second user are determined (step 402) for example via the monitoring agent 13, and it is determined if the first user and the second user are together at a particular location (step 404). The particular location can include for example a mall, a movie theater, a school, or an activity field where organized sports are played. If the first and second user are together at the particular location, a weighting of the particular location is determined (step 406), for example by accessing the mapping datastore 26, and a relationship strength between the first user and the second user is determined based on the frequency of the users being located together and the weighting of the particular location or locations (step 408). For example if the particular location includes a school which the first and second user are both required to attend, the weighting of the particular location can be relatively low since the users' presence together at the same time does not necessarily suggest a strong relationship. A school therefore can be considered a forced location. If the particular location includes a shopping mall, the mall may be weighted relatively higher since users may not be required to be present at a shopping mall for any particular reason. A shopping mall can be considered a voluntary location.

Figure 4B:
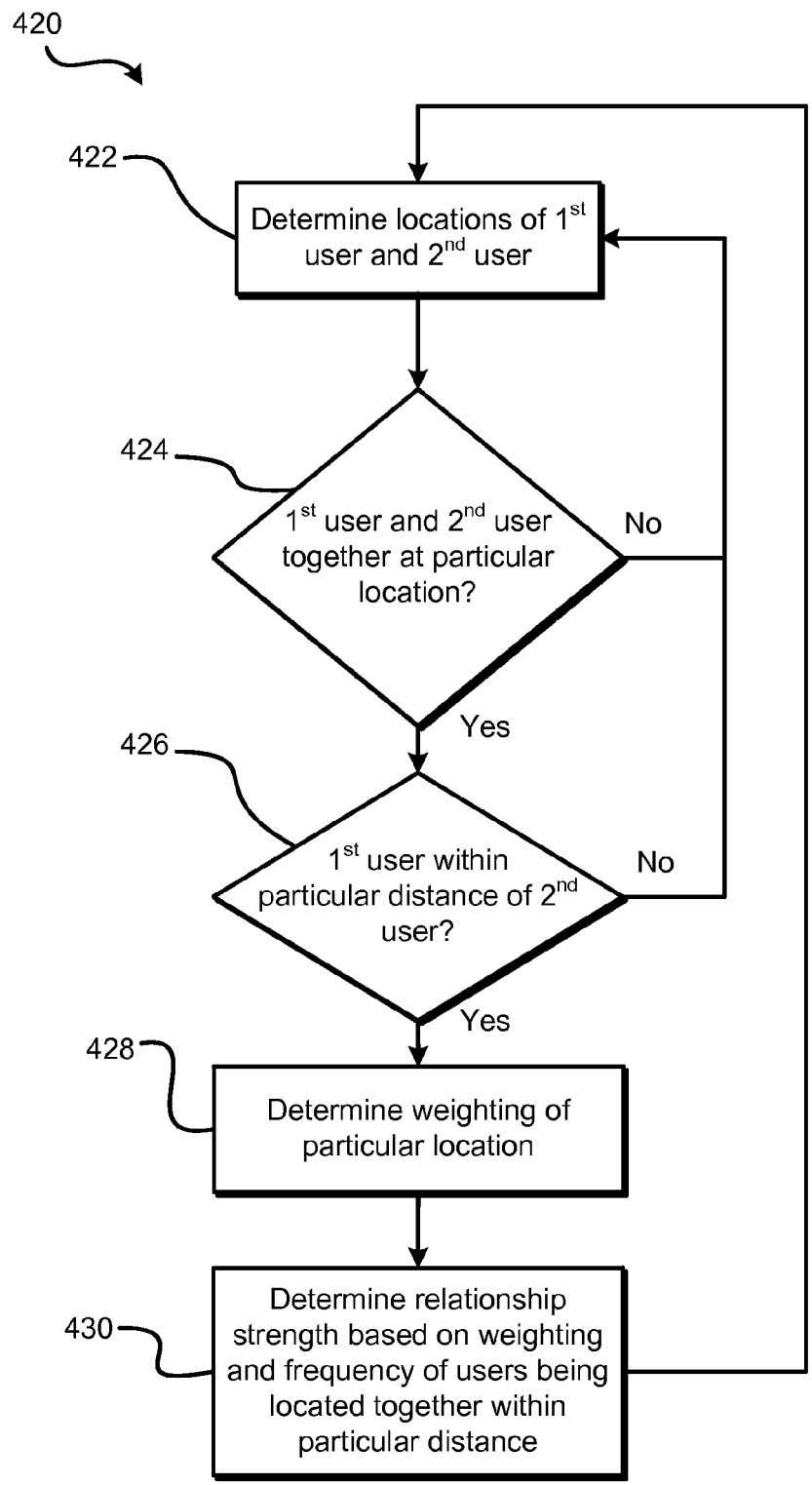

Relationship strength determined can further be based on the proximity of users within a particular location, wherein users that are frequently within a particular distance of each other at a particular location are determined to have a higher relationship strength, for example, users within a particular distance of each other at a particular mall, movie theatre, or school. Referring to FIG. 4b, a method 420 for determining relationship strength is shown, which method 420 is described with reference to the components shown in the exemplary system 10, but which method 420 is not limited to such components. Locations of a first user and a second user are determined (step 422) for example via the monitoring agent 13, and it is determined if the first user and the second user are together at a particular location (step 424). The particular location can include for example a mall, a movie theater, a school, or an activity field where organized sports are played. If the first and second users are together at the particular location, it is determined in step 426 if the first and second users are within a particular distance of each other (e.g. 50 meters, 100 meters, 200 meters). If the first and second users are within the particular distance of each other, a weighting of the particular location is determined (step 428), for example by accessing the mapping datastore 26, and a relationship strength between the first user and the second user is determined based on the frequency of the users being located together at the particular distance at the particular location and the weighting of the particular location or locations (step 430). The weighting of a forced location (e.g. school) can be relatively low, whereas the weighting of a voluntary location (e.g. shopping mall) can be relatively high. Proximity of users is a weaker basis for determining a higher relationship strength at forced location than it is at a voluntary location.

In an example situation pursuant to the above-described methods, two users, "John" and "Steven" are on the same soccer team and are determined to attend practices frequently after school at a nearby park. The determined frequency of being at the park does not suggest a strong relationship between John and Steven, since soccer practice is an arguably forced circumstance wherein participation is to at least some extent required.

In another example situation, two users "John" and "Sally" are determined by location data to go to the shopping mall together every Saturday over a length of time to watch a movie and then spend time at a food court at the shopping mall. Proximity of John to Sally within the mall can be used as a basis for determining that they are socializing together at the mall and not simply coincidentally at the mall. The determined frequency of being at the mall strengthens the relationship between John and Sally since the interactions at the mall correspond to arguably voluntary interactions. A close proximity of John and Sally at the mall further serves as a basis for increasing relationship strength. The mall can be considered a voluntary location, wherein close proximity of users serves to increase relationship strength.

In another example situation, John and Sally go to the same school and sit near each other in the same class. School can be considered a forced location, wherein close proximity of users does not result in a determination of increased relationship strength or serves to increase relationship strength to a lesser extent than would be the case for a voluntary location. A close proximity of John and Sally at school does not serve as a basis for increasing relationship strength, or alternatively, serves as a basis to increase relationship strength to a lesser extent than close proximity at a voluntary location (e.g. a shopping mall).

The methods described can enable voluntary interactions between users to be used as a basis for a relatively higher determined relationship strength, whereas forced interactions or interactions resulting from a user's obligation can be disregarded or weighted less in determining relationship strength.

Figure 4C:
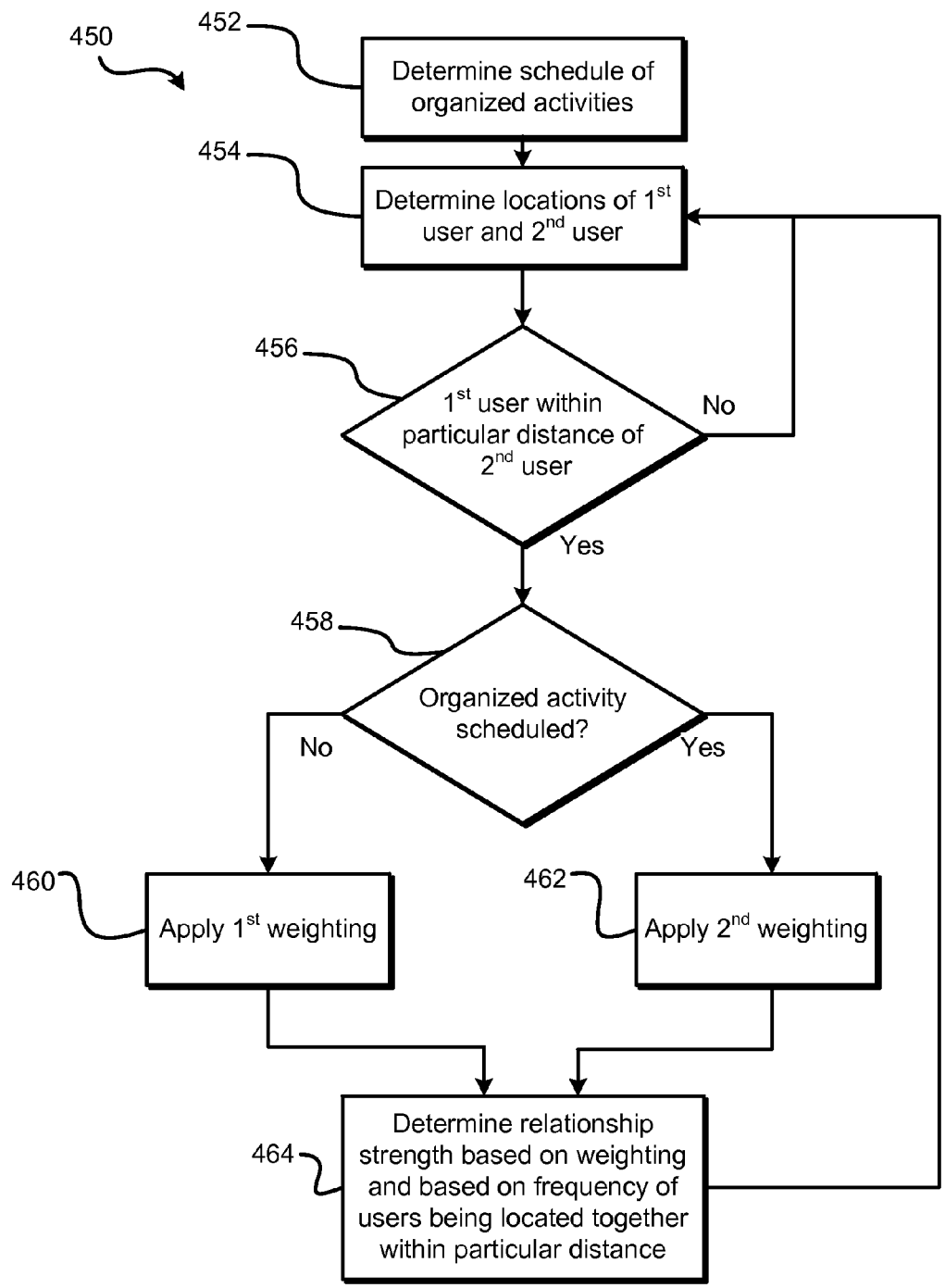

The relationship strength between users can further be determined based on scheduling of an organized activity. Referring to FIG. 4c, a method 450 for determining relationship strength is shown, which method is described with reference to the components shown in the exemplary system 10, but which method is not limited to such components. In a step 452, a schedule of organized activities for a first user is determined. The organized activities can correspond for example to sports practices and competitions, club meetings, and school trips, which the first user participates in. The schedule of organized activities can be determined by the monitoring manager 20 based on indications provided by a monitoring user via the overseeing user application 28 or based on indication received via a particular network-accessible data source 47. An indication of an organized activity can include a location and/or time for such activity.

Locations of the first user and a second user are determined (step 454). The first user ("monitored user") corresponds for example to the monitored device 12 and the second user corresponds for example to another device 18. It is determined in step 456 if the first user is within a particular distance of the second user (e.g. 400 meters, 1000 meters), for example via the mapping engine 24 and mapping datastore 26. If the first user is determined not to be within a particular distance of the second user, locations are determined again at step 454 at a later time. If the first user is determined to be within the particular distance of the second user at a particular time it is determined if an organized activity is scheduled at such time (step 458). If an organized activity is scheduled, a first weighting is applied to the determination that the first and second users are within a particular distance of each other (step 460). If an organized activity is not scheduled, a second weighting is applied to the determination that the first and second users are within a particular distance of each other (step 462). In a step 464, a relationship strength between the first and second user is determined based on the frequency that the first and second users are within a particular distance of each other and based on the corresponding determined weightings, for example a prior-determined relationship strength is increased. The second weighting is for example less than the first weighting based on the assumption that the first and second users are required to be at a scheduled organized activity, so their presence together during the activity does not necessarily imply a stronger relationship.

Figure 5:
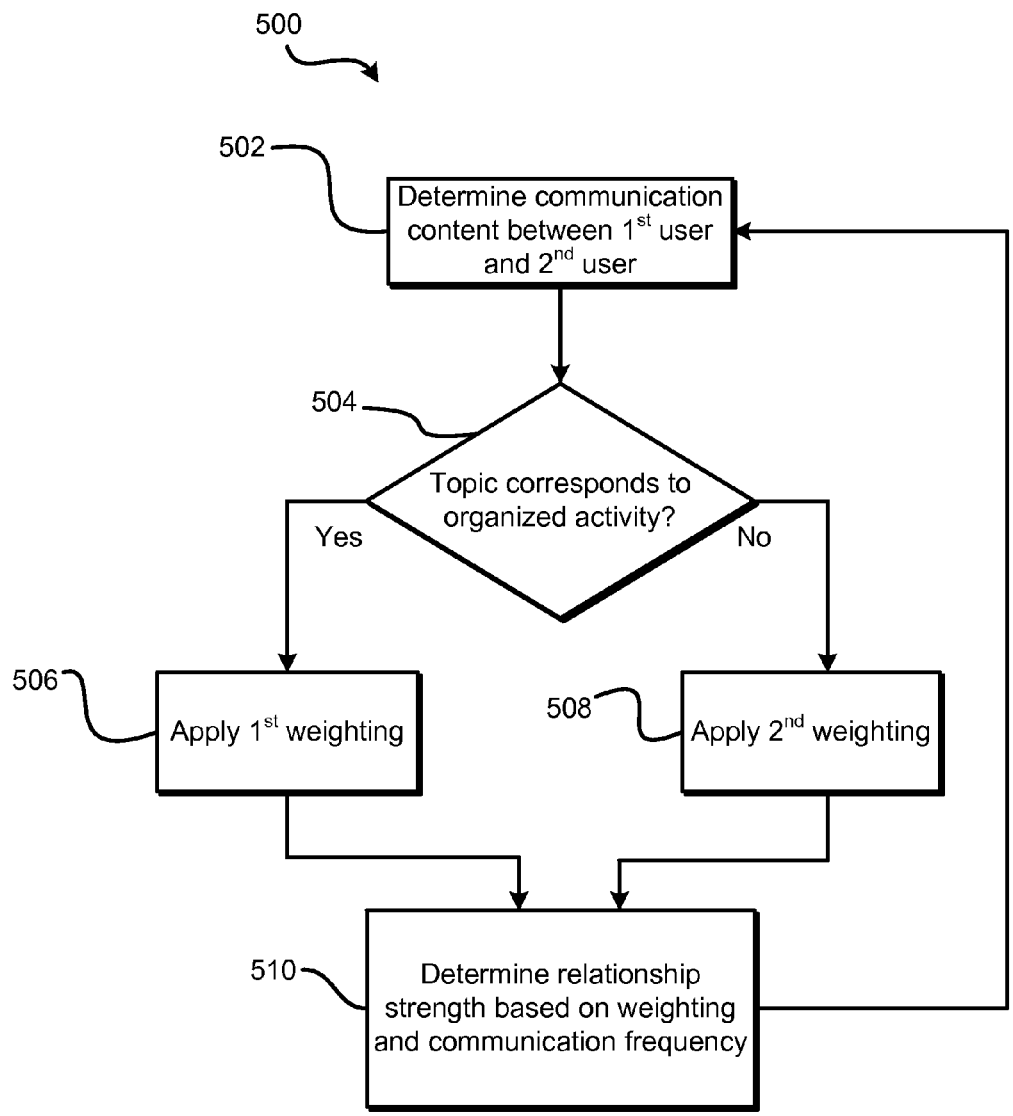

Relationship strength can further be determined based on content of communications between users. Referring to FIG. 5, a method 500 for determining relationship strength is shown, which method is described with reference to the components shown in the exemplary system 10, but which method is not limited to such components. In a step 502, content of a detected communication between a first and second user are determined. The first user ("monitored user") corresponds for example to the monitored device 12 and the second user corresponds for example to another device 18. The monitoring agent 13 can for example access a communication datastore 11 including SMS messages, chat histories, emails, voicemails stored on the monitored device 12 of a monitored user. Alternatively, other network-accessible data sources 47 can be accessed by the monitoring manager 20 to determine communication content.

It is determined in step 504 if a topic of the detected communication corresponds to an organized activity, for example a school band practice. If the topic of communication does not correspond to an organized activity, a first weighting is applied to the detected communication (step 506). If the topic of communication does correspond to an organized activity, a second weighting is applied to the detected communication (step 508). In a step 510, a relationship strength between the first and second user is determined based communication frequency and based on the respective weightings, for example a prior-determined relationship strength is increased. The second weighting is for example less than the first weighting based on the assumption that the communication between the first and second users may be forced based on their joint participation in a particular activity, so their interaction does not necessarily imply a stronger relationship.

In an example situation, a particular user "Jake" only sends text messages to a particular user "Jerry" about the school marching band in which they both participate. The determined frequency of communication does not result in a determined high relationship strength between Jake and Jerry, because marching band interactions are arguably forced, since participation may to at least some extent be required by virtue of membership in the marching band. In another example situation, a particular user "John" using the Facebook™ social networking application posts several comments on Jake's network-accessible Facebook™ wall, which is configurable for view by other Facebook™ users via the Internet. Jake and John frequently discuss topics such as baseball, movies and late night parties using the Facebook™ application. The determined frequency of communication results in an increase in determined relationship strength, especially since the topics are arguably voluntary and further since the topics are arguably diverse. The methods described can enable communications between users concerning arguably voluntary topics to be used as a basis for a relatively higher determined relationship strength, whereas communications concerning arguably forced topics can be disregarded or weighted less in determining relationship strength.

Relationship strength between two users can further be determined based on latency time between communications. For example, if a user responds quickly to communications from another user, relationship strength between the users is determined to be greater than if the user takes a longer period of time to respond.

In an example situation, "Sally" sent an electronic text message via her device to "Mary" on Saturday at 3:30 pm. That same day, "Caroline" sent an electronic text message to Mary at 3:50 pm. Mary does not reply back to Sally via electronic text message until the following Sunday at 5:00 pm. Mary does, however, reply back to Caroline via electronic text message at 3:51 pm Saturday, the same day Caroline sent message to Mary. The quick response from Mary to Caroline is indicative of a stronger relationship strength between Mary and Caroline than between Mary and Sally, as is determinable for example via the relationship engine 22 of the monitoring manager 20.

Relationship strength between two users can further be determined based on the variety of topics of user communication content between two users, wherein a greater number of topics corresponds to a higher relationship strength. Groups or individuals engaging in varied topics in their communications correspond to higher determined relationship strength among such groups and individuals In an example situation, Heather, Jessica and Sally communicate about a variety of topics including boys, movies, school, other girls they don't like, parties and other topics using Facebook™, Twitter™, and electronic text messages (e.g. SMS messages). Even though they communicate about such topics with other individuals, the variety of topics discussed within the group including Heather, Jessica and Sally increases the determined relationship strength within that group.

The methods described above can be combined to determine relationships between users. For example, relationship strength between two users can be determined based on how often users are located near each other, the topics of their communications, locations of one or both of the users relative to a particular location, scheduled activities of one or both of the users, and latency time between communications of the users.

The monitoring manager 20 or monitoring agent 13 can receive a request, for example via the overseeing user application 28, to filter or sort data. A monitoring user can request to filter relationship strength data for display based on a rate of change of relationship strength between users, wherein the overseeing user application 28 displays an indication based on the particular rate of change. For example, referring to FIG. 6, based on a filter request, one of the peer indications 102-106 corresponding to the current highest rate of change of relationship strength with respect to the monitored user can be shown, and the remaining peer indications can be hidden. A highest rate of relationship strength change can correspond to the peer indication 102-106 which moves the most distance over time in the display 100. Once a filter is applied in rendering the display, a monitoring user is enabled to dig deeper into details corresponding to displayed indications. Additional displays such as icons or communication excerpts can be rendered available to give insights into the reasoning behind a change in relationship strength, as described below.

In an example situation, a display enabled by the overseeing user application 28 shows an indication representing Sally moved from being within an innermost demarcation radiating out from a POV indication to being three times the distance from the POV indication. A monitoring user who is a parent of a user corresponding to the POV indication filters the display to only see an indication corresponding to Sally. Once a filter is applied in rendering the display, a monitoring user is enabled to dig deeper into details corresponding to displayed indications for example to see how many times the indication corresponding to Sally has moved, whether the indication has moved closer or farther away from the POV indication over a particular time period, the average distance of the indication (i.e. average relationship strength) from the POV over a particular time period, and the closest and farthest the indication has been from the POV indication over a particular time period.

The monitoring manager 20 or monitoring agent 13 can further receive a request to filter relationship strength data based on a selection of one or more of the plurality of other users, for example specified by name or other identifier, wherein the overseeing user application 28 displays indications corresponding to the specified user, excluding indications corresponding to non-specified users, or alternatively, displaying indications corresponding to non-specified users in an alternative manner.

A request to filter relationship strength data can further be received based on particular communication protocol (e.g. telephone, email, SMS) between users, for example between a monitored user and other users, wherein indications corresponding to the particular communication protocol are displayed. Indications of relationship strength not corresponding to the particular communication protocol can be excluded or displayed in an alternative manner.

A request to filter relationship strength data can further be received based on location of users in communication with or having communicated with a particular user such as the monitored user, wherein indications are displayed corresponding to the location of such other users. For example, a monitoring user can provide a request to display indications corresponding to other users positioned within a particular distance from the monitored user at particular times.

Users who have communicated with a particular user such as the monitored user can be grouped based on one or more criteria wherein a particular displayed indication can correspond to more than one user. A particular user can correspond to more than one group and more than one indication. Referring to FIG. 6 for example, the indication 102 can correspond to three people and one of the three people can also correspond to the indication 103. Indications can be sized based on a number of grouped users associated with the indication. For example, indications corresponding to a large group are larger than indications corresponding to a smaller group. A request to filter data based a selection of one or more of the groupings can be received, and one or more indications corresponding to the selection of the one or more of the groupings can be displayed. A grouping of users can include or exclude the monitored user. Referring to FIG. 6, a group including the monitored user can be represented by the POV indication 101, which can correspond for example to the monitored user and one or more other users grouped according to one or more criteria.

Criteria for grouping users can include for example frequency of communication among the users who communicate with a monitored user, wherein the grouping is determined at least in part based on such frequency of communication. The grouping can include or exclude the monitoring user. The monitoring manager 20 can for example access network-accessible data sources 47 using credentials of a monitored user to determine communications between other users who communicate with the monitored user, for example via conversations on a social networking website. An indication of a frequency of communication within the grouping can be displayed, for example an indication showing which user or users have the highest frequency of communication within a group or have a frequency of communication exceeding a particular threshold. Criteria for grouping users can further include for example a quality of communication of the monitored user and other users who communicate with the monitored user. The grouping can include or exclude the monitoring user. The quality of communication can be based on content of communications of the users, for example language used in the communications, wherein the grouping is determined at least in part based on such content of communications.

Criteria for grouping users can further include for example location of the monitored user and other users who communicate with the monitored user, wherein the grouping is determined at least in part based on the determined locations of the monitored user and other users who communicate with the monitored user. For example, users within a particular geographic distance of the monitored user can be grouped together. The monitoring manager 20 can for example access network-accessible data sources 47 using credentials of a monitored user to determine geographic locations of the users who communicate with the monitored user, for example geographic locations made available on a social networking website.

The monitoring manager 20 determines changes in relationship strength between users occurring over time. Positioning of peer indications relative to a point of view indication can change based on changes in relationship strength, while the POV indication remains static, for example in the center of a display area, since it is from the perspective of the POV which data is rendered. In FIG. 6, arrows 120 show change in location of the peer indication 105 based on determined change in relationship strength between the monitored user corresponding to the POV indication 101 and the one or more other users corresponding to the peer indication 105 over a particular time period.

Referring to FIG. 7, a graph 150 including an example plot 152 of communication frequency versus time between a monitored user and another user or group of users is shown. At time equal to 0 when monitoring is commenced, regular interaction (e.g. every other day) occurred between a monitored user and one or more other particular users. At time equal to Z (e.g. one year), frequency of interaction is 0 indicating no communication between a monitored user and the one or more other particular users. For time equal to 0, an indication of the type shown in FIG. 6 corresponding to the one or more particular users is displayed closer to an indication corresponding to the monitored user than at time equal to Z. The rate at which communication frequency drops from regular interaction to no interaction, or vice versa, can also be used in determining the relationship quality, for example a rapid increase or decrease in interaction can suggest a change in health of the relationship or can suggest an event or relationship change that contributes to the change in interaction.

In addition to relationship strength, relationship quality between a first user and one or more other users can be determined, and an indication of such relationship quality can be displayed. Relationship quality can be determined based on communications between a monitored user and one or more other users. The monitoring agent 13 can for example access a communication datastore 11 including SMS messages, chat histories, emails, and voicemails stored on the monitored device 12 of a monitored user to determine communication content. Alternatively, other network-accessible data sources 47 can be accessed by the monitoring manager 20 to determine communication content.

Communications including aggressive tone, sexual language, drug-related language, or other explicit language are considered alarming. Communications including alarming topics can lead to a corresponding warning notification generated for example by the overseeing user application 28. While communications including alarming topics can increase relationship strength, such communications can effect relationship quality in a negative manner. A monitoring user via the overseeing user application 28 can choose for example to enable reporting of the specific content of monitored communications corresponding to alarming topics using a filter request.

Communication topics such as cars, hair, movies can be deemed neutral. Communications corresponding to neutral topics can be relevant in determining relationship strength without triggering a warning notification. Neutral topics can increase relationship strength and can effect relationship quality in a positive manner, or alternatively, have no effect on relationship quality. A monitoring user via the overseeing user application 28 can choose for example to preclude reporting of the specific content of monitored communications corresponding to neutral topics. Communications which only correspond to one or a few instances of a particular topic ("unique topics") whether alarming, neutral, or not classified can be precluded from contributing to relationship strength or relationship quality until a minimum threshold amount of communication corresponds to such topic. In such manner, more relevant topics can be distinguished from potentially inconsequential topics.

In an example situation, Johnny and Frederick communicate about cars, movies, and bands on their Facebook™ wall. These topics are varied and lead to a determination that Johnny and Frederick have a strong relationship strength. These topics are not alarming do not contribute negatively to a determination of relationship quality and do not lead to a corresponding warning notification generated for example by the overseeing user application 28.

In another example situation, Johnny and Tim send electronic text messages to each other about a party happening on Friday night, the messages indicating that the party will have beer and illicit drugs. These topics are alarming and can contribute negatively to a determination of relationship quality, for example via the relationship engine 22, and can lead to a corresponding warning notification being generated, for example by the overseeing user application 28. A parent of Johnny or Tim may find such alarming topics interesting and relevant to the well-being of their child.

Icons representative of detected communication content between users and groups of users can be displayed to aide in understanding of user relationships. Multiple icons can be associated with a particular individual or group. Icons used for categorizing topics of communication can include for example a marijuana leaf for topics corresponding to illegal drug use and an angry emoticon corresponding to aggression. An icon used for indicating relationship quality can include for example a barometer with adjustable fill depending on a determined relationship quality.

Referring to FIG. 8, an indication of relationship quality is shown as an icon in the form of a relationship quality barometer 130 including fill 132. The fill 132 expands upwards and changes color from green to yellow to red as a determined relationship quality turns from "healthy" to "borderline" to "unfriendly" or "unhealthy". Content of communication corresponding to topics such as sex, drugs, and aggression can for example trigger a determination of an unhealthy relationship corresponding to red fill 132. Content of communication corresponding to topics such as cars, movies, and music bands can for example trigger a determination of a healthy relationship corresponding to green fill 132. Content of communication corresponding to a mix of healthy and unhealthy topics can for example trigger a determination of a borderline relationship corresponding to yellow fill 132. The quality barometer 130 can for example be positioned in proximity to a corresponding peer indication 102-106 of the type shown in FIG. 6.

Topics and their corresponding effect on determined relationship quality can be customized specifically for a particular monitored user by the corresponding monitoring user. The overseeing user application 28 can provide options of common topics, for example, sex, drugs and aggression, allowing a monitoring user to select one or more topics and to indicate whether a particular topic corresponds to a healthy, a borderline, or an unhealthy relationship quality. A topic which is indicated as unhealthy by one monitoring user may be indicated as borderline or healthy by another monitoring user. Monitoring users can alternatively provide their own custom topics for a particular monitored user, for example religion, heavy metal music, and activism, and provide a corresponding indication of relationship quality. A monitoring user can further provide an indication of the relative importance of topics, and the monitoring manager 20 can assign weights to topics based on the indication of importance to use in determining relationship quality. Further based on the indications of topics provided by a monitoring user, an alert can be triggered responsive to detecting one or more communications involving a monitored user corresponding to an indicated topic. Triggered alerts can be communicated to a monitoring user via suitable electronic messaging protocol.

The color of the peer indication of the type shown in the display 100 of FIG. 6 can also be representative of relationship quality, wherein a particular peer indication is shown in a color corresponding to the current relationship quality between the user or users associated with the particular peer indication and the user or users associated with a the displayed POV indication. For example a healthy relationship can correspond to green, an unhealthy relationship can correspond to red, and a borderline relationship can correspond to yellow. Intensity of the color can change based on relationship strength, more intense (i.e. darker) for example when the relationship strength is stronger corresponding to a peer indication closer to the POV indication and less intense (i.e. lighter) when the relationship strength is weaker corresponding to a peer indication farther from the POV indication. Alternatively, other indications of relationship quality can be used and additional examples are described below.

A monitoring user can request to filter or sort data for display based on relationship quality or a rate of change of relationship quality. Display of data can show fluctuation of relationship quality or lack of fluctuation of relationship quality over time.

In an example situation, a monitoring user, for example via the overseeing user application 28, filters a display to see only interactions between her child and other users that are unhealthy, and are accordingly represented by red color on a respective quality barometer or peer indication. In the example, the monitoring user determines that "Sally" is in an unhealthy state with the monitored child. The monitoring user then selects a displayed indication corresponding to Sally to view a history of the relationship quality between Sally and the monitored child and discovers that over time the relationship quality has frequently been unhealthy (red), whereas earlier in time the relationship quality was healthy, as represented by the color green on a quality barometer.

Figure 9A:
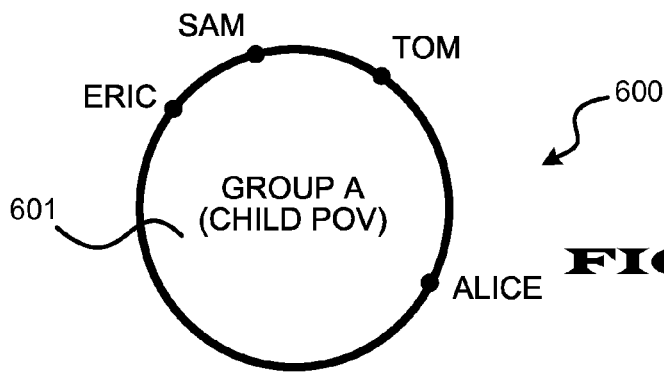
Figure 9B:
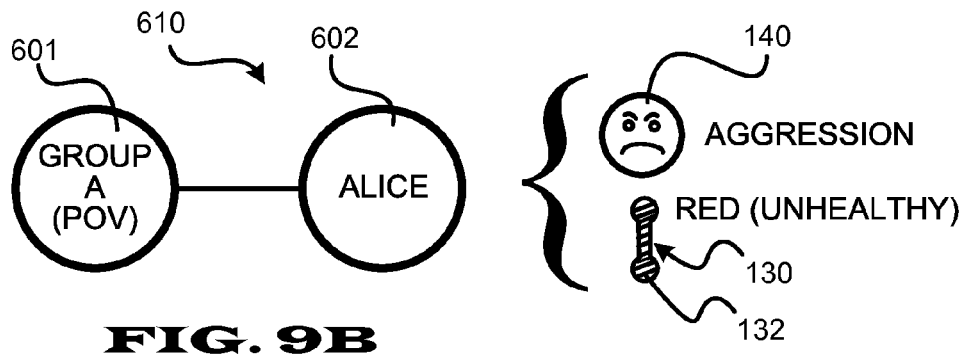
Figure 9C:
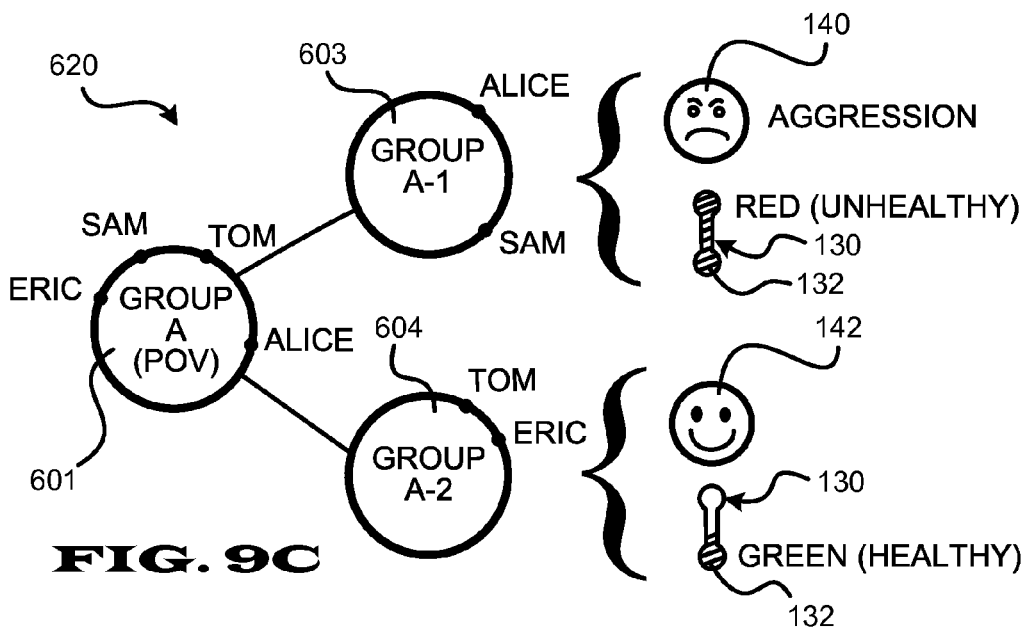

Referring to FIGS. 9A-9C, example displays 600, 610, and 620 are respectively shown. The displays 600, 610, and 620 can be enabled for example by the overseeing application 28 on a monitoring device 16. Display 600 corresponds to a first point in time, display 610 corresponds to a second point in time after the first point in time, and display 620 corresponds to a third point in time after the second point in time. The displays 600, 610, 620 are conducive to show dispersing ("breaking up") of friendships among users. Display 600 of FIG. 9A shows a point of view ("POV") indication 601 corresponding to a particular Group "A" including a monitored user, in this case a child of a monitoring user) and four other persons: "Eric", "Sam", "Tom", and "Alice".

The display 610 of FIG. 9B shows the POV 601 in relation to a peer indication 602 corresponding to one of its group members "Alice". The peer indication 602 can be displayed for example responsive to a request to filter by particular group member(s), in this case Alice, or to filter by relationship quality of group members, in this case "unhealthy" relationship quality. Based on content of communication between Alice and one or more other members of Group A, the relationship quality between Alice and Group A is determined to be unhealthy and a quality barometer 130 with red fill 132 indicating the unhealthy relationship is positioned adjacent to the peer indication 602. Content of communication between Alice and one or more other members of Group A corresponds to aggression resulting in display in an aggression icon 140. Aggression can further be determined based on historically rapid fluctuation of relationship quality. Alternatively, other suitable indications can be used to show relationship quality. For example, the color of the peer indication can change based on the determined relationship quality (e.g. red for unhealthy, green for healthy), and intensity of such color can change based on relationship strength (e.g. more intense for stronger relationship strength and less intense for weaker relationship strength). Accordingly, a peer indication closer to the POV indication can be colored more intensely (e.g. darker) than a peer indication farther from the POV indication.

The display 620 of FIG. 9C shows the POV 601, a peer indication 603 corresponding to a subgroup A-1 including "Alice" and "Sam", and a peer indication 604 corresponding to a subgroup A-2 including "Tom" and "Eric". Peer indications 603, 604 can be displayed for example responsive to a request to filter by particular group member(s), in this case all group A users, or to filter by relationship quality of group members, in this case "unhealthy" and "healthy" relationship qualities. Based on content of communication between Alice and one or more other members of group A, an aggressive unhealthy relationship quality is determined. Accordingly, Alice is shown in group A-1 corresponding to peer indication 603 with a quality barometer 130 having red fill 132 indicating the unhealthy relationship and an aggression icon 140 indicating aggression in the relationship positioned adjacent to the peer indication 603. Based on content of communication between Sam and one or more other members of group A, an aggressive unhealthy relationship quality is determined. Accordingly, Sam is also shown in group A-1 corresponding to peer indication 603.

Based on content of communication between Tom and one or more other members of group A, a healthy relationship quality is determined. Accordingly, Tom is shown in group A-2 corresponding to peer indication 604 with a quality barometer 130 having green fill 132 positioned adjacent to the peer indication 604 indicating the healthy relationship. Based on content of communication between Eric and one or more other members of group A, the relationship quality between Eric and group A is determined to be healthy. Accordingly, Eric is also shown in group A-2 corresponding to peer indication 604. Content of communication between Tom and Eric and one or more other members of Group A do not correspond to aggression and accordingly a non-aggression icon 142 is displayed. Alternatively, other suitable indications can be used to show relationship quality. The display 620 of FIG. 9C as shown provides insight to a monitoring user of conflict between group members resulting in dissolving of friendships which split mutual friends. The display 620 may suggest that Alice and Sam are splitting from Tom and Eric.

A monitoring user can change the point of view indication using the overseeing user application 28. By default a monitored user, for example the child of a monitoring user using the overseeing user application 28, can correspond to the POV indication. The monitoring user using the overseeing user application 28 can select another individual or group represented by another indication (e.g. a peer indication) to correspond to a new POV indication. The display is updated to reflect the new point of view. It can be shown for example whether a particular person selected as a point of view has healthy or unhealthy relationships, exhibits aggressive or bullying behavior, or is the victim of aggression or bullying.

Figure 10A:
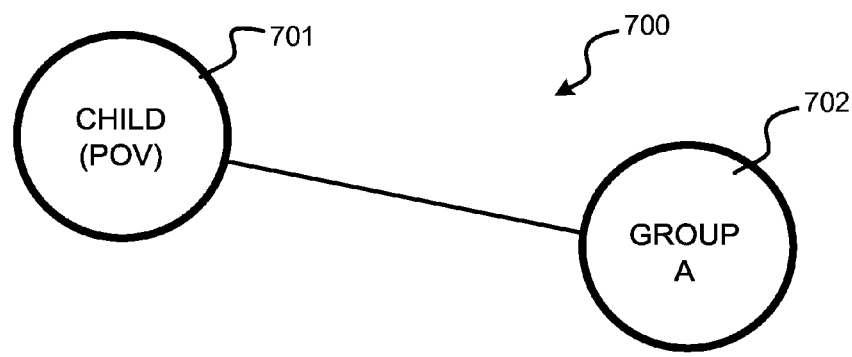
Figure 10B:
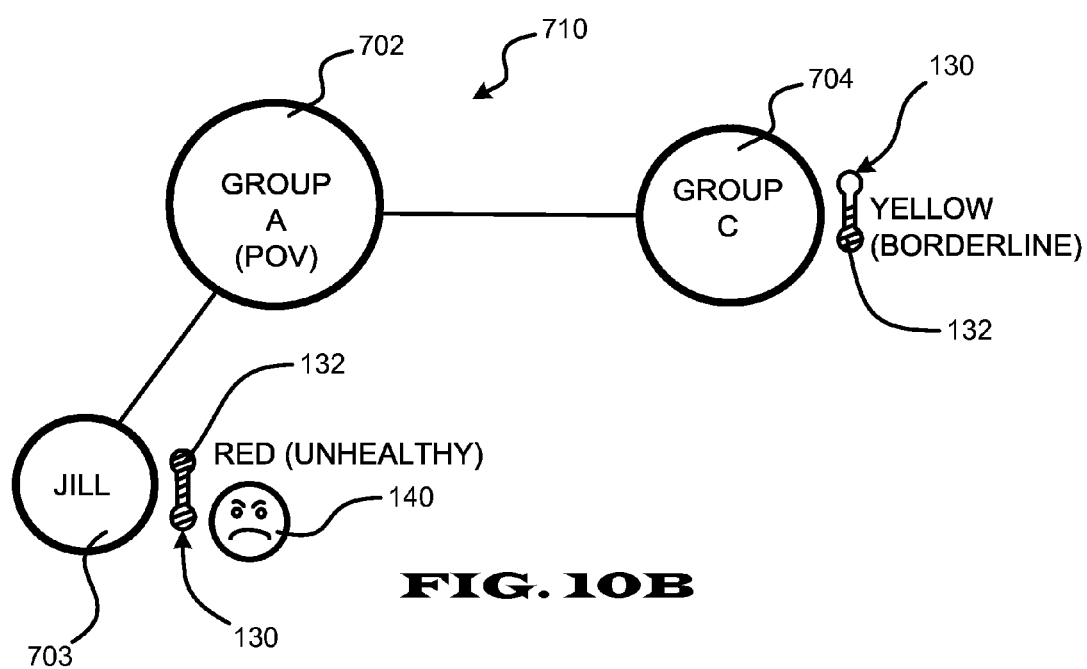

Referring to FIG. 10A, an example display 700 shows a monitored user corresponding to a POV indication 701, for example corresponding to a child of the monitoring user. The POV indication 701 is shown distanced from a peer indication 702 corresponding to a Group A based on frequency of communication of the monitored user with one or more members of the Group A. The monitoring user may be concerned about the social influences of members of Group A on the monitored user. The monitoring user can change the point of view indication to correspond to the Group A to see Group A's interaction with other users and groups of users. Referring to FIG. 10B, in a display 710, the indication 702 corresponding to Group A becomes the POV indication based on a user request, wherein the monitored user (child) is now part of Group A. The indication 702 is shown in relation to an indication 703 corresponding to a girl, "Jill", and an indication 704 is shown corresponding to a Group C. A quality barometer 130 with yellow fill 132 indicates a borderline relationship between the Group A and the Group C. A quality barometer 130 with red fill 132 next to the indication 703 indicates an unhealthy relationship between the Group A and Jill. Further, an aggression icon 140 next to the indication 703 suggests that Group A is bullying or exhibiting other form of aggression against Jill. Group A may include the monitored user represented by the indication 701 in FIG. 10A.

Determined relationship strength and relationship quality between users can change over time. A change in relationship quality does not necessarily correspond to a change in relationship strength. Referring to FIG. 11, a graph 750 including an example plot 752 of relationship health versus time between a monitored user and another user or group of users is shown. At time equal to 0 when monitoring commenced, relationship health between a monitored user and one or more other particular users is healthy represented by the color green. At time equal to X (e.g. one week), relationship health between the monitored user and the one or more other particular users is unhealthy represented by the color red. As shown, over the time period X, relationship health varied from healthy represented by green to borderline represented by yellow to unhealthy represented by red. Such fluctuation can be indicative that the monitored user and other user are frenemies, or that aggression occurs toward a user or users.

Figure 12A:
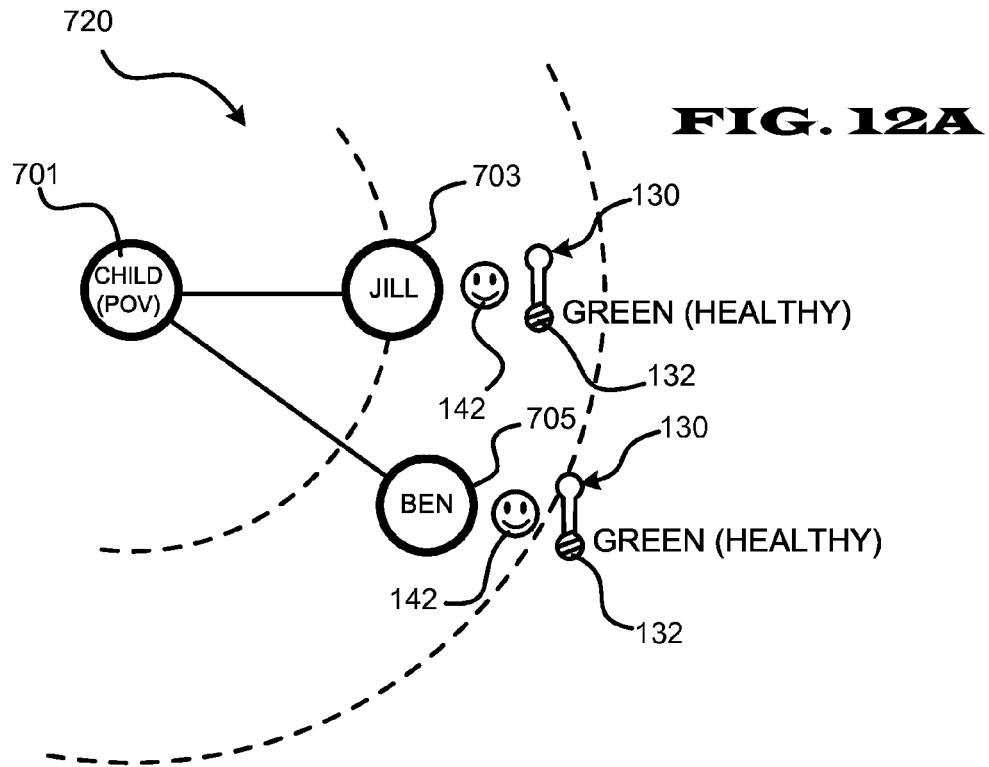

Referring to FIGS. 12A through 12D, example displays 720, 730, 740, and 750 show changes in relationship strength and quality between a monitored user represented by a POV indication 701 and other users, "Jill" and "Ben", respectively represented by peer indications 703 and 705. In FIG. 12A, an example display 720 corresponding to a first day, June $23^{rd}$, shows a monitored user corresponding to the POV indication 701, for example corresponding to a child of the monitoring user. The POV indication 701 is shown distanced from the peer indication 703 corresponding to Jill and distanced from a peer indication 705 corresponding to Ben based on respective communication frequencies. Quality barometers 130 with green fill 132 next to the indications 703, 705 indicate a healthy relationship between the monitored user and both Jill and Ben based on content of communication. Further, non-aggression icons 142 next to the indications 703, 705 suggest that the monitored user represented by the POV indication 701 is not bullying or exhibiting other forms of aggression against Jill or Ben, and Jill and Ben are not bullying or exhibiting other forms of aggression against the monitored user.

Figure 12B:
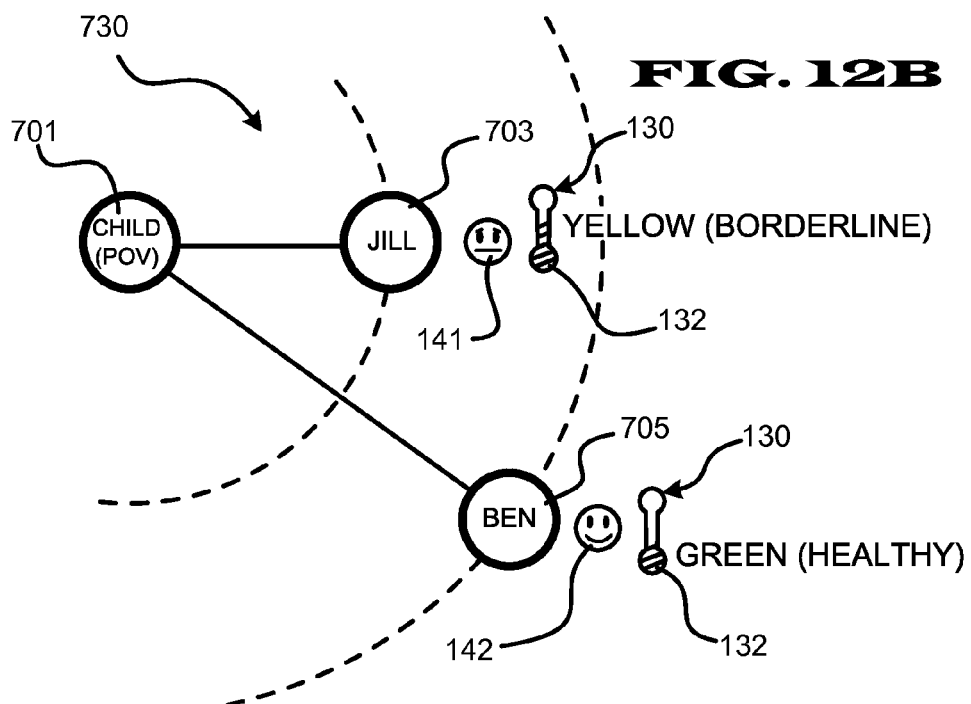

In FIG. 12B, an example display 730 corresponding to a second day, June 24th, shows the distance of the indication 705 from the POV indication 701 to have increased from that shown in the display 720 of the day before based on a decreased frequency of communication between the monitored user and Ben. The relationship quality between the monitored user and Ben designated by the quality barometer 130 adjacent to the indication 705 is healthy, unchanged from that shown in the display 720 corresponding to the prior day. The distance of the indication 703 from the POV indication 701 is unchanged from that shown in the display 720 of the day before indicating an unchanged frequency of communication between the monitored user and Jill. The relationship quality between the monitored user and Jill designated by the quality barometer 130 adjacent to the indication 703 is borderline indicating a change in content of communication from that shown in the display 720 corresponding to the prior day. A borderline icon 141 accompanies the quality barometer 130 adjacent the indication 703 indicating borderline aggressive communication.

In FIG. 12C, an example display 740 corresponding to a third day, June 25th, shows the distance of the indication 705 from the POV indication 701 to remain unchanged from that shown in the display 730 of the day before. The relationship quality between the monitored user and Ben designated by the quality barometer 130 adjacent to the indication 705 is healthy, unchanged from that shown in the display 730 corresponding to the prior day. The distance of the indication 703 from the POV indication 701 is unchanged from that shown in the display 730 of the day before, indicating an unchanged frequency of communication between the monitored user and Jill. The relationship quality between the monitored user and Jill designated by the quality barometer 130 adjacent to the indication 703 is unhealthy (e.g. unfriendly) indicating a change in content of communication from that shown in the display 730 corresponding to the prior day.

In FIG. 12D, an example display 750 corresponding to a fourth day, June 26th, shows the distance of the indication 705 from the POV indication 701 to remain unchanged from that shown in the display 740 of the day before. The relationship quality between the monitored user and Ben designated by the quality barometer 130 adjacent to the indication 705 is healthy, unchanged from that shown in the display 740 corresponding to the prior day. The distance of the indication 703 from the POV indication 701 is unchanged from that shown in the display 740 of the day before, indicating an unchanged frequency of communication between the monitored user and Jill. The relationship quality between the monitored user and Jill designated by the quality barometer 130 adjacent to the indication 703 is healthy (e.g. friendly) indicating a change in content of communication from that shown in the display 740 corresponding to the prior day. A non-aggression icon 142 accompanies the quality barometer 130 adjacent the indication 703 indicating non-aggressive communication.

The example displays 720, 730, 740, and 750 show quickly alternating relationship quality between the monitored user and Jill despite constant communication frequency. The alternating relationship quality may suggest that at times the monitored user and Jill are friendly and at other times there is bullying behavior between the monitored user and Jill. The overseeing user application 28 can provide an indication to a monitoring user that Jill and the monitored user are friends/enemies ("frenemies").

Rapidly changing relationship quality may be of concern to a monitoring user. A monitoring user may want only to see indications of users corresponding to an elevated change in relationship quality. A monitoring user can via the overseeing user application 28 filter data corresponding to determined relationship quality between a monitored user and a plurality of other users based on a particular rate of change of relationship quality, wherein the overseeing user application 28 displays indications corresponding to users which correspond to the particular rate of change of relationship quality, for example a relatively high rate of change of relationship quality. Relationship quality can be displayed for example using a quality barometer or other indication as described above.

Determined changes in relationship strength and relationship quality among users and groups can be shown in a moving time-lapse animation in a device display. The overseeing user application 28 enables display of an animation sequence showing changes in relationships over a particular period of time with automatic and manual user controls. An animation can show one or more of changing distances between indications showing changing relationship strength and changing colors representing changing quality of relationships and quality of discussions, and ending of relationships. User controls can enable a monitoring user to set a time range for displaying the animation, for example a week, month, quarter, year, or all relationship history. Controls enable a user to slow down, speed up, stop, pause, reverse and play an animation. Controls further enable a user to jump to a point in time along a timeline of the relationship history.

Time-lapse animations can be filtered in the manner described above with reference to other displays, for example based on communication type (e.g. text or phone) geographic location, relationship quality, and relationship strength. Controls enable a user to drill down into details of particular data sources in time-lapse animations, for example by selecting displayed indications corresponding to particular individuals or groups. Time lapse animations can be compared with other time-lapse animations concurrently, for example side by side or through an opacity overlay. For example, a first animation corresponding to a recent time period can be shown at 100% opacity over top of a second animation corresponding to an earlier time period at 50% opacity, which animations can be run concurrently. Alternatively, a first animation can be shown next to a second animation.

Statistics can be provided to show a monitoring user changes occurring from the beginning to the end of a time range. Further, a monitoring user can with a recording feature schedule a recording during a particular time period to enable creation of a time-lapse animation when recording is complete.

Referring to FIGS. 13A through 13C, displayed frames 800, 810, and 820 of an example animation enabled by the monitoring manager 20 via the overseeing user application 28 are shown. Changes in relationship strength and quality between a monitored user, represented by a POV indication 801, and another user, "Bill", represented by a peer indication 802, are shown. In FIG. 13A, a first animation frame 800 shows the peer indication 802 a particular distance from the POV indication 801 based on the relationship strength, shows a quality barometer 130 with green fill 132 corresponding to a healthy relationship, and shows a non-aggression icon 142 corresponding to non-aggressive interactions.

In FIG. 13B, a second animation frame 810 corresponding to a week after the first animation frame 800 shows the peer indication 802 distanced farther from the POV indication 801 than in frame 800 based on a decrease in relationship strength from the prior week. An arrow 803 is displayed to clearly show the direction of motion of the peer indication 802 in FIG. 13B. The quality barometer 130 is shown with green fill 132, and a non-aggression icon 142 is provided indicating no change in the relationship quality from the previous week. In FIG. 13C, a third animation frame 820 corresponding to two weeks after the first animation frame 800 shows the peer indication 802 distanced closer to the POV indication 801 than in frames 800 and 810 based on an increase in relationship strength from the previous week. An arrow 804 is displayed to clearly show the direction of motion of the peer indication 802 in FIG. 13C. The quality barometer 130 is shown with green fill 132, and a non-aggression icon 142 is provided indicating no change in the relationship quality from the prior week. Alternatively, the fill 132 can change color in the animation based on a change in relationship quality or the non-aggression icon can change to a different icon based on changes in communication content.

Figure 14A:
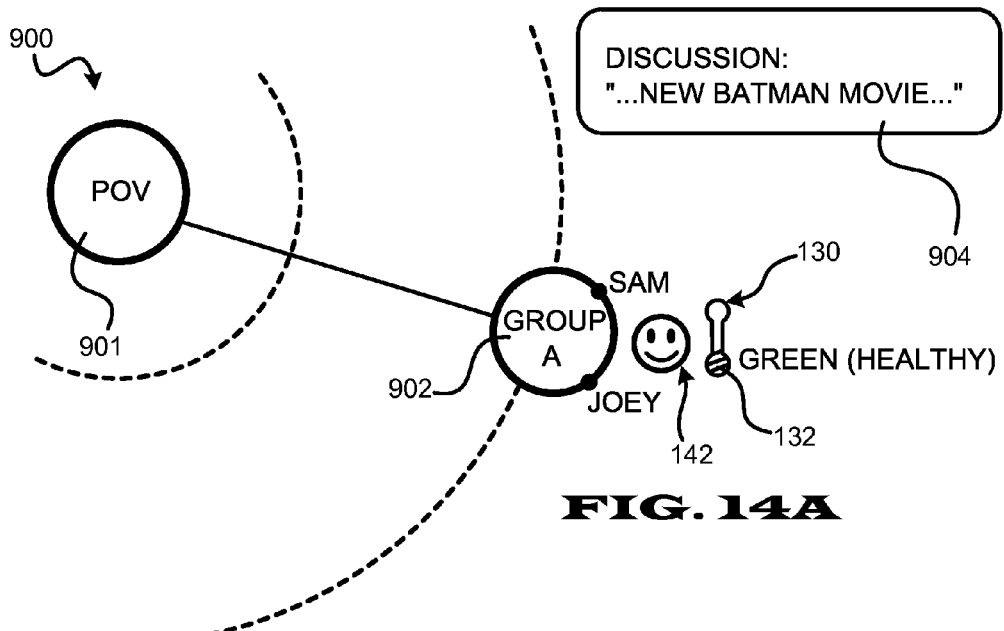

A display, for example enabled by the overseeing user application 28, can show communications or excerpts thereof used in the determination of relationship quality. Referring to FIG. 14A, an example display 900 shows a POV indication 901 corresponding to a monitored user distanced from a peer indication 902 corresponding to a Group A including users "Sam" and "Joey" based on communication frequency between the monitored user and one or more members of Group A. A quality barometer 130 with green fill 132 indicates a healthy relationship, and a non-aggression icon 142 indicates non-aggression between the monitored user and Group A. A discussion excerpt 904 ("new Batman movie") retrieved from the communication content of the users shows a topic giving rise to the relationship quality suggested by the quality barometer 130 and non-aggression icon 142. A monitoring user would likely view the suggested relationship quality and discussion excerpt 904 in the display 900 as neutral and not giving rise to alarm.

Figure 14B:
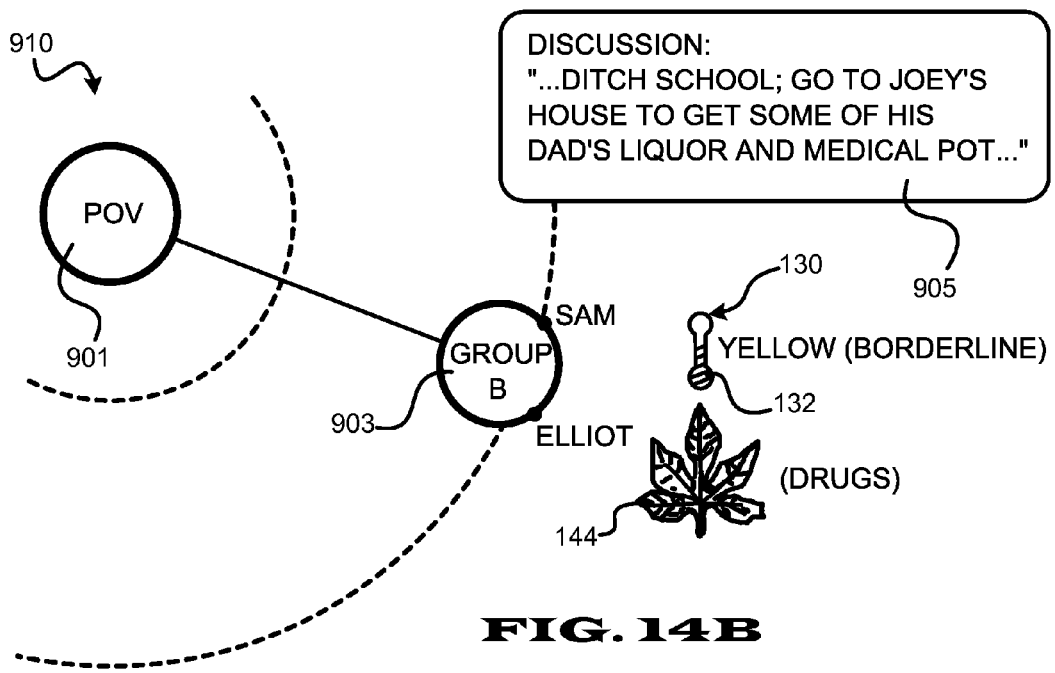

Referring to FIG. 14B, an example display 910 shows the POV indication 901 distanced from a peer indication 903 corresponding to a Group B including users "Sam" and "Elliot" based on communication frequency between the monitored user and one or more members of Group B. A quality barometer 130 with yellow fill 132 indicates a borderline relationship, and a cannabis leaf icon 144 indicates potential communication regarding illicit drugs between the monitored user and Group B. A discussion excerpt 905 (" . . . ditch school, go to Joey's house to get some of his dad's liquor and medical pot . . . ") retrieved from the communication content of the users shows a topic giving rise to the relationship quality suggested by the quality barometer 130 and cannabis leaf icon 144. A monitoring user would likely view the suggested relationship quality and discussion excerpt 905 in the display 910 as giving rise to alarm.

The monitoring manager 20 or monitoring agent 13 can categorize communication content to enable display of indications corresponding to a particular category. Communication content can be categorized responsive to a request to sort by a monitoring user. An example category can be "illicit drugs", "sex", or other alarming or neutral category. An indication can be provided to a monitoring user of a number of topics in monitored communications which correspond to a particular category, for example how many references to illicit drugs or other potentially alarming category are made in monitored communications between a monitored user and other users.

A monitoring user can request to filter or sort data for display by the topics an individual or group have been involved with a point of view party over time. An indication can be provided to a monitoring user based on a request to sort of how many topics were alarming, neutral or borderline, unique or corresponding to other particular classification.

In an example situation, a monitoring user via the overseeing user application 28 filters a display to view only interactions between Sally and the monitoring user's child (monitored user). The monitoring user further filters the display to view how many interactions correspond to alarming topics, providing the monitoring user the ability to see patterns in the monitored child's circle of friends, enemies, and/or frenemies.

Groupings of a monitored user and her peers can provide insight into particulars of relationships. A person's close friends can be determined based on how many groups they are part of. In an example situation, in a display enabled for example by the overseeing user application 28, user "Jessica" corresponds to a POV indication, the display further including a plurality of peer indications corresponding to groups. For the purpose of the example, since Jessica corresponds to the POV indication, she is considered part of every group corresponding to a displayed peer indication. It is determined that Sally is in 80% of the groups represented by the displayed peer indications, more than any other user corresponding to a peer indication. Based on this determination, it is determined that Jessica and Sally are potentially close friends and perhaps best friends and an indication of this can be provided to a monitoring user via the overseeing user application 28 in a display.

As indicated above, groupings of persons can be based on frequency and quality of communications, which communications can include for example common or shared discussions available via particular data sources, for example via Twitter™ or a Facebook™ Wall. Groupings of persons can be based on frequency and proximity of persons, for example persons which regularly go to the mall together after school may be determined to be members of a particular group. A monitoring user via the overseeing user application 28 can tag or label particular groups to observe corresponding relationships more closely and to be informed of happenings or when new groups formulate including persons within a particular tagged or labeled group.

As indicated above, an indication of a frequency of communication within the grouping can be displayed, for example an indication showing which user or users have the highest frequency of communication within a group or have a frequency of communication exceeding a particular threshold. In such a manner a leader of a group or most influential person of a group can be determined and indicated. Such leader or most influential person can be a monitored user or other user. For example, referring to FIG. 9C, if Eric communicates the most among group members, Eric's name can be visually distinguished from the names of Alice, Sam, and Tom. Further, a person in a group which has the most contact with the POV can be indicated. For example, referring to FIG. 14A, if Sam has the most interaction with the user corresponding to the POV 901, Sam's name can be visually distinguished from Joey's name (e.g. highlighted).

Persons can be designated as frenemies via the overseeing user application 28 based on a relatively high level of fluctuation of relationship quality. A frenemy may have consistently high relationship strength, but relationship quality that fluctuates from aggressive to healthy. Further, a determination of aggression can be made based on frequent fluctuation of relationship quality and topics of communication content.

The monitoring manager 20 via the overseeing user application 28 can provide an indication of the end of a relationship and the nature of relationship that ends. It can be determined whether a friendship has gone bad, for example based on a fight, disagreement, betrayal or peer pressure. It can be determined when friends become geographically distanced from each other, for example if one friend moves to another state. It can be determined when friends grow apart, for example when one friend finds a new circle of friends and gradually disassociates from an earlier relationship.

It can further be determined how users are affected by the ending of a relationship of other persons and how the ending of a relationship affects members of a group. For example, if a friendship has gone bad causing a split between particular group members, does it result in the splitting of a group because group members take sides in the split based on which friend they choose to side with. It can further be determined whether a group slowly dissipates (i.e. users decrease communications) or change forms of interaction, for example use text messages instead of phone call or use Twitter™ tweets instead of text messages. A monitoring user can change the person corresponding to a POV indication to get insight into the nature of an ending relationship.

Displays enabled pursuant to the above systems can provide helpful hints to enable users to interpret data and enable using features of the overseeing user application 28. Such hints can also provide algorithms showing how relationships are determined and displayed, and how distance between indications, size of indications, and colors are used in a display.

Reports can be provided by the monitoring manager 20 to a monitoring user at particular intervals (e.g. weekly) via email or other communication method. Reports can include time-lapse animations which can be based on filters enabled by a monitoring user or unfiltered. Reports can include statistics, for example graphs showing changes in relationship strength, changes in relationship quality, new individuals or groups, alerts based on triggering conditions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method of displaying indications of relationships of device users, the method comprising:
providing an application enabling a monitoring agent on a first mobile computing device corresponding to a first user;
monitoring communications between the first user and at least one other user via the monitoring agent on the first mobile computing device;
determining by a location determining system on the first mobile computing device via the monitoring agent the geographic location of the first mobile computing device;
determining the geographic location of the at least one other user;
determining when the first user is located within a particular geographic distance of the at least one other user;
determining relationship strength between the first user and the at least one other user wherein the relationship strength is determined based on a frequency of communication between the first user and the at least one other user and based on a frequency of the first user being located within a particular geographic distance of the at least one other user;
displaying on a display of a computing device corresponding to a second user a first indication corresponding to the first user; and
displaying on the display at least one other indication corresponding to the at least one other user, wherein the at least one other indication is shown distanced from the first indication based on the determined relationship strength.

2. The method of claim 1, further comprising:
receiving an indication of at least one particular geographic location; and
determining the relationship strength further based on the geographic location of at least the first user relative to the at least one particular geographic location when the first user is located within the particular distance of the at least one other user.

3. The method of claim 1, further comprising:
determining a schedule of organized activities for the first user; and
in determining the relationship strength, weighting the determination of the first user being located within a particular geographic distance of the at least one other user less during a period of time corresponding to the organized event than during a period of time not corresponding to the organized event.

4. The method of claim 1, further comprising:
determining a frequency that the first user and the at least one other user are located together at a particular geographic location; and
determining the relationship strength further based on the frequency of the first user and the at least one other user being located together at the particular geographic location.

5. The method of claim 4, further comprising:
determining a weighting of the particular geographic location;
determining the relationship strength further based on the weighting of the particular geographic location.

6. The method of claim 5, wherein the particular geographic location comprises at least one of a school, a shopping mall, or activity field.

7. The method of claim 1, further comprising determining the relationship strength based on content of the communications between the first user and the at least one other user.

8. The method of claim 7, further comprising:
determining at least one particular topic corresponding to an organized activity associated with the first user; and
weighting communication corresponding to the at least one particular topic less than communication not corresponding to the particular topic in determining the relationship strength.

9. The method of claim 7, further comprising:
determining a number of topics of the content of the communications between the first user and the at least one other user; and
determining the relationship strength further based on the number of topics.

10. The method of claim 1, further comprising:
determining at least one latency time between the communications between the first user and the at least one other user; and
determining the relationship strength further based on the at least one latency time between the communications between the first user and the at least one other user.

11. The method of claim 1, wherein the at least one other user comprises a plurality of other users and the at least one other indication comprises a plurality of other indications corresponding to at least one of the plurality of other users, and wherein the plurality of other indications are shown distanced from the first indication based on the determined relationship strength of the at least one of the plurality of other users and the first user.

12. The method of claim 11, the method further comprising:
receiving a request to filter data corresponding to the determined relationship strength based on a rate of change of relationship strength; and
displaying an indication corresponding to at least one of the plurality of other users which correspond to the request to filter data based on a rate of change of relationship strength.

13. The method of claim 12, further comprising displaying an indication corresponding to at least one of the plurality of other users which correspond to the highest rate of change of relationship strength.

14. The method of claim 11, further comprising:
receiving a request to filter data corresponding to the determined relationship strength based on a selection of one or more of the plurality of other users; and
displaying indications corresponding to the selection of the one or more of the plurality of other users.

15. The method of claim 11, further comprising:
receiving a request to filter data corresponding to the determined relationship strength based on a selection of a particular communication protocol; and
displaying indications corresponding to the particular protocol.

16. The method of claim 15, wherein the communication protocol corresponds to at least one of Short Message Service (SMS) protocol or telephone protocol.

17. The method of claim 11, further comprising:
receiving a request to filter data corresponding to the determined relationship strength based on geographic location of one or more of the plurality of other users; and
displaying indications corresponding to the geographic location of the one or more of the plurality of other users.

18. The method of claim 11, further comprising determining at least one grouping of the plurality of other users based on one or more criteria, wherein at least one of the plurality of other indications corresponds to the at least one grouping.

19. The method of claim 18, wherein the at least one grouping is a plurality of groupings, the method further comprising:
receiving a request to filter data corresponding to the determined relationship strength of the plurality of other users based on a selection of one or more of the groupings; and
displaying at least one indication corresponding to the selection of the one or more of the groupings.

20. The method of claim 18, wherein a particular one of the plurality of other users corresponds to a plurality of groupings.

21. The method of claim 18, further comprising:
determining a frequency of communication of the plurality of other users; and
determining the at least one grouping of the plurality of other users based on the frequency of communication.

22. The method of claim 18, further comprising:
determining a frequency of communication of the first user and the plurality of other users within the at least one grouping; and
displaying an indication of the frequency of communication of at least one of the first user or the plurality of other users within the at least one grouping.

23. The method of claim 22, wherein the at least one indication of the frequency of communication comprises an indication of one or more of the first user and the plurality of other users having a frequency of communication within the at least one grouping exceeding a particular threshold.

24. The method of claim 22, further comprising:
determining a quality of communication of the first user and the plurality of other users within the at least one grouping based on content of communications within the at least one grouping; and
displaying an indication of the quality of communication of at least one of the first user or the plurality of other users within the at least one grouping.

25. The method of claim 1, further comprising displaying the at least one other indication at a size based on a number of users corresponding to the at least one other indication.

26. The method of claim 1, further comprising:
determining a relationship quality between the first user and the at least one other user based on content of communications between the first user and the at least one other user; and
displaying a particular indication based on the determined relationship quality.

27. The method of claim 26, further comprising displaying the particular indication at least one of on or in proximity to the at least one other indication.

28. The method of claim 1, further comprising:
determining a relationship quality between the first user and the at least one other user; and
displaying a color at least one of on or in proximity to the at least one other indication based on the determined relationship quality.

29. The method of claim 28, further comprising displaying an intensity of the color based on the distance from the first indication to the at least one other indication.

30. The method of claim 28, wherein the relationship quality is determined based on content of communications between the first user and the at least one other user.

31. The method of claim 1, further comprising:
determining a relationship quality between the first user and the at least one other user based on content of communications between the first user and the at least one other user; and
displaying a particular indication of the relationship quality.

32. The method of claim 31, wherein displaying the indication of the relationship quality comprises displaying changes in the relationship quality which have occurred over a period of time.

33. The method of claim 31, wherein the at least one other user comprises a plurality of other users and the at least one other indication comprises a plurality of other indications corresponding to at least one of the plurality of other users, and wherein the plurality of other indications are shown distanced from the first indication based on the determined relationship strength of at least one of the plurality of other users and the first user, the method further comprising:
  receiving a request to filter data corresponding to the determined relationship quality between the first user and the plurality of other users based on a level of relationship quality; and
  displaying an indication corresponding to at least one of the plurality of other users which corresponds to the level of relationship quality.

34. The method of claim 1, further comprising:
  determining a content of communication between the first user and the at least one other user; and
  displaying an icon representative of the content of communication in proximity to the at least one other indication.

35. The method of claim 34, wherein the content of the communication corresponds to illicit drugs, and the icon corresponds to a visual representation of illicit drugs.

36. The method of claim 34, wherein the content of the communication corresponds to aggression, and the icon corresponds to a visual representation of an angry face.

37. The method of claim 34, further comprising displaying a plurality of icons representative of the content of communication in proximity to the at least one other indication.

38. The method of claim 1, further comprising:
  determining a content of communication between the first user and the at least one other user;
  categorizing the content of communication between the first user and the at least one other user in a plurality of categories; and
  displaying an indication of the content of communication based on a user-selected category.

39. The method of claim 1, further comprising:
  determining a content of communication between the first user and the at least one other user;
  categorizing the content of communication between the first user and the at least one other user in a plurality of categories; and
  displaying an indication of a number of topics of communications between the first user and the at least one other user corresponding to a particular category.

40. The method of claim 1, further comprising displaying the at least one other indication at a decreased distance from the first indication responsive to an increase in the determined relationship strength.

41. The method of claim 1, further comprising displaying the at least one other indication at an increased distance from the first indication responsive to a decrease in the determined relationship strength.

42. The method of claim 1, wherein the first indication and the at least one other indication are displayed showing the change in the relationship strength over a period of time.

43. The method of claim 42, wherein the at least one other user comprises a plurality of other users and the at least one other indication comprises a plurality of other indications corresponding to at least one of the plurality of other users, and wherein the plurality of other indications are shown distanced from the first indication based on the determined relationship strength of the at least one of the plurality of other users and the first user, the method further comprising:
  receiving a request to filter data corresponding to the determined relationship strength based on a selection of one or more of the plurality of users; and
  displaying an indication corresponding to the selection of the one or more of the plurality of users.

44. The method of claim 1, wherein the at least one other user comprises a plurality of other users and the at least one other indication comprises a plurality of other indications corresponding to at least one of the plurality of other users, and wherein the plurality of other indications are shown distanced from the first indication based on the determined relationship strength of the at least one of the plurality of other users and the first user, the method further comprising:
  receiving a request to filter data corresponding to the determined relationship strength based on a selection of one or more of the plurality of users; and
  displaying an indication corresponding to the selection of the one or more of the plurality of users.

45. The method of claim 1, wherein the at least one other user comprises a plurality of other users, the method further comprising:
  receiving a request to determine relationship strength between a particular one of the plurality of other users and others of the plurality of other users;
  determining the relationship strength between the particular one of the plurality of users and the others of the plurality of other users wherein the relationship strength is determined based on a frequency of communication between the particular one of the plurality of users and the others of the plurality of other users;
  displaying on the display a particular indication corresponding to the particular one of the plurality of other users; and
  displaying on the display at least one other particular indication corresponding to the others of the plurality of other users, wherein the at least one other particular indication is shown distanced from the particular indication based on the determined relationship strength.

46. The method of claim 45, further comprising determining the relationship strength between the particular one of the plurality of users and the others of the plurality of other users and the first user, wherein the relationship strength is determined based on a frequency of communication between the particular one of the plurality of users and the others of the plurality of other users and the first user, wherein the at least one other particular indication corresponds to the others of the plurality of other users and the first user.

47. The method of claim 1, further comprising:
  determining that content of communication between the first user and the at least one other user corresponds to a particular topic;
  determining a relationship quality between the first user and the at least one other user based on the determination that the content of communication corresponds to the particular topic; and
  displaying a particular indication based on the determined relationship quality.

48. The method of claim 1, further comprising:
  receiving an indication of a particular topic and an indication of a quality of the particular topic from a second user;

determining content of communication between the first user and the at least one other user corresponds to the particular topic;
determining a relationship quality between the first user and the at least one other user based on the determination that the content of communication corresponds to the particular topic and based on the indication of the quality of the particular topic received from the second user; and
displaying a particular indication based on the determined relationship quality.

49. A method of determining and displaying indications of relationships of device users, the method comprising:
providing an application enabling a monitoring agent on a computing device corresponding to a first user;
monitoring communications between the first user and a plurality of other users via the monitoring agent on the first computing device;
determining relationship strength between the first user and the plurality of other users wherein the relationship strength is determined based on a frequency of communication between the first user and the plurality of other users;
determining a frequency of communication of the plurality of other users;
determining via the monitoring agent on the first mobile computing device a quality of communication of the first user and the plurality of other users based on content of communications, wherein the content comprises at least one of text language or voice language;
determining at least one grouping of the plurality of other users based on the frequency of communication and the quality of communication;
displaying on a display of a computing device corresponding to a second user a first indication corresponding to the first user; and
displaying on the display a plurality of other indications corresponding to at least one of the plurality of other users wherein at least one of the plurality of other indications corresponds to the at least one grouping, wherein the plurality of other indications are shown distanced from the first indication based on the determined relationship strength of the at least one of the plurality of other users and the first user.

50. The method of claim 49, further comprising:
determining geographic location of the first user and the plurality of other users; and
determining the at least one grouping of the plurality of other users further based on the geographic location of the first user and the plurality of other users.

51. A method of determining and displaying indications of relationships of device users, the method comprising:
providing an application enabling a monitoring agent on a computing device corresponding to a first user and a computing device corresponding to at least one of a plurality of other users;
monitoring communications between the first user and the plurality of other users via the monitoring agent on the first computing device;
determining relationship strength between the first user and the plurality of other users wherein the relationship strength is determined based on a frequency of communication between the first user and the plurality of other users;
monitoring communication of the plurality of other users via the monitoring agent on the computing device of the at least one of the plurality of other users;
determining via the monitoring of the communications of the plurality of other users at least one grouping of the plurality of other users based on one or more criteria;
determining a frequency of communication of the plurality of other users within the at least one grouping;
displaying on a display of a computing device corresponding to a second user a first indication corresponding to the first user;
displaying on the display a plurality of other indications corresponding to the at least one of the plurality of other users wherein at least one of the plurality of other indications corresponds to the at least one grouping, wherein the plurality of other indications are shown distanced from the first indication based on the determined relationship strength of the at least one of the plurality of other users and the first user; and
displaying on the display an indication of the frequency of communication of the at least one of the plurality of other users within the at least one grouping.

52. The method of claim 51, wherein the indication of the frequency of communication comprises an indication of one or more of the plurality of other users having a frequency of communication within the at least one grouping exceeding a particular threshold.

53. The method of claim 51, wherein the indication of the frequency of communication comprises an indication of one or more of the plurality of users having the highest frequency of communication within the at least one grouping.

54. A method of determining and displaying indications of relationships of device users, the method comprising:
providing an application enabling a monitoring agent on a computing device corresponding to a first user;
monitoring communications between the first user and at least one other user via the monitoring agent on the first computing device;
determining relationship strength between the first user and the at least one other user wherein the relationship strength is determined based on a frequency of communication between the first user and the at least one other user;
determining a relationship quality between the first user and the at least one other user based on the monitoring;
displaying on a display of a computing device corresponding to a second user a first indication corresponding to the first user; and
displaying on the display at least one other indication corresponding to the at least one other user, wherein the at least one other indication is shown distanced from the first indication based on the determined relationship strength;
displaying a first color at least one of on or in proximity to the at least one other indication when the determined relationship quality is healthy; and
displaying a second color at least one of on or in proximity to the at least one other indication when the determined relationship quality is unfriendly.

55. A method of determining and displaying indications of relationships of device users, the method comprising:
providing an application enabling a monitoring agent on a computing device corresponding to a first user;
monitoring communications between the first user and a plurality of other users via the monitoring agent on the first computing device;
determining relationship strength between the first user and the plurality of other users wherein the relationship strength is determined based on a frequency of communication between the first user and the plurality of other users;

determining relationship quality between the first user and the plurality of other users based on content of monitored communications between the first user and the plurality of other users, wherein the content comprises at least one of text language or voice language;

receiving a request to filter data corresponding to the determined relationship quality between the first user and the plurality of other users based on a particular level of relationship quality wherein the level of the relationship quality corresponds to an unhealthy relationship quality;

displaying on a display of a computing device corresponding to a second user a first indication corresponding to the first user; and displaying on the display an indication corresponding to at least one of the plurality of other users which corresponds to the level of relationship quality indicated in the request, wherein the at least one of the plurality of other users is shown on the display as distanced from the first indication based on the determined relationship strength.

56. A method of determining and displaying indications of relationships of device users, the method comprising:

providing an application enabling a monitoring agent on a computing device corresponding to a first user;

monitoring communications between the first user and a plurality of other users via the monitoring agent on the first computing device;

determining relationship strength between the first user and the plurality of other users wherein the relationship strength is determined based on a frequency of communication between the first user and the plurality of other users;

determining relationship quality between the first user and the plurality of other users based on content of monitored communications between the first user and the plurality of other users, wherein the content comprises at least one of text language or voice language;

receiving a request to filter data corresponding to the determined relationship quality between the first user and the plurality of other users based on a rate of change of relationship quality;

determining rates of change of relationship quality between the first user and the plurality of other users;

displaying on a display of a computing device corresponding to a second user a first indication corresponding to the first user; and displaying on the display an indication corresponding to at least one of the plurality of other users which corresponds to the request to filter data based on the rate of change in the relationship quality, wherein the at least one of the plurality of other users is shown on the display as distanced from the first indication based on the determined relationship strength.

57. A method of determining and displaying indications of relationships of device users, the method comprising:

providing an application enabling a monitoring agent on a computing device corresponding to a first user;

monitoring communications between the first user and at least one other user via the monitoring agent on the first computing device;

determining relationship strength between the first user and the at least one other user wherein the relationship strength is determined based on a frequency of communication between the first user and the at least one other user;

determining a content of communication between the first user and the at least one other user, wherein the content comprises at least one of text language or voice language;

categorizing the content of communication between the first user and the at least one other user in a plurality of categories;

receiving a selection of a category from a second user;

displaying on a display of a computing device corresponding to the second user a first indication corresponding to the first user;

displaying on the display at least one other indication corresponding to the at least one other user, wherein the at least one other indication is shown distanced from the first indication based on the determined relationship strength; and displaying an indication of the content of communication based on the category selected by the second user, wherein the indication of the content of the communication comprises an indication of how many of the topics of communications between the first user and the at least one other user correspond to an alarming category.

58. A method of determining and displaying indications of relationships of device users, the method comprising:

providing an application enabling a monitoring agent on a computing device corresponding to a first user;

monitoring communications between the first user and at least one other user via the monitoring agent on the first computing device;

determining relationship strength over a period of time between the first user and the at least one other user wherein the relationship strength is determined based on a frequency of communication between the first user and the at least one other user;

displaying on a display of a computing device corresponding to the second user a first indication corresponding to the first user;

displaying on the display at least one other indication corresponding to the at least one other user, wherein the first indication and the at least one other indication are displayed as a time-lapse animation showing the first indication distanced from the second indication based on the determined relationship strength over the period of time.

59. A method of determining and displaying indications of relationships of device users, the method comprising:

providing an application enabling a monitoring agent on a computing device corresponding to a first user;

monitoring communications between the first user and at least one other user via the monitoring agent on the first computing device;

determining relationship strength between the first user and the at least one other user wherein the relationship strength is determined based on a frequency of communication between the first user and the at least one other user;

receiving an indication of a particular topic and an indication of an importance of the particular topic from a second user;

determining content of communication between the first user and the at least one other user corresponds to the particular topic, wherein the content comprises at least one of text language or voice language;

determining a relationship quality between the first user and the at least one other user based on the determination that the content of communication corresponds to the particular topic and based on the indication of the importance of the particular topic received from the second user;

displaying on a display of a computing device corresponding to the second user a first indication corresponding to the first user;

displaying on the display at least one other indication corresponding to the at least one other user, wherein the at least one other indication is shown distanced from the first indication based on the determined relationship strength; and displaying on the display a particular indication based on the determined relationship quality.

60. A network comprising:

a mobile computing device corresponding to a first user, the device comprising at least one non-transitory computer readable storage medium having encoded thereon instructions that, when executed by one or more processors of the device, cause the device to perform a process including:

enabling a monitoring agent on the first mobile computing device;

monitoring communications between the first user and at least one other user via the monitoring agent on the first mobile computing device; and determining by a location determining system on the first mobile computing device via the monitoring agent the geographic location of the first mobile computing device; and a computing system connected via the network to the mobile computing device, the computing system comprising at least one non-transitory computer readable storage medium having encoded thereon instructions that, when executed by one or more processors of the system, cause the system to perform a process including:

determining the geographic location of the at least one other user;

determining when the first user is located within a particular geographic distance of the at least one other user;

determining relationship strength between the first user and the at least one other user wherein the relationship strength is determined based on a frequency of communication between the first user and the at least one other user and based on a frequency of the first user being located within a particular geographic distance of the at least one other user;

transmitting to a display of a computing device corresponding to a second user a first indication corresponding to the first user; and transmitting to the display at least one other indication corresponding to the at least one other user, wherein the at least one other indication is shown distanced from the first indication based on the determined relationship strength.

61. A method comprising:

providing an application enabling a monitoring agent on a first mobile computing device corresponding to a first user;

monitoring communications between the first user and a plurality of other users via the monitoring agent on the first mobile computing device;

receiving a particular request to filter data corresponding to the determined relationship strength based on a rate of change of relationship strength;

determining relationship strength between the first user and the plurality of other users wherein the relationship strength is determined based on a frequency of communication between the first user and the plurality of other users;

determining rates of change of relationship strength between the first user and the plurality of other users and determining at least one of the plurality of other users which corresponds to the particular request to filter data;

displaying on a display of a computing device corresponding to a second user a first indication corresponding to the first user; and displaying on the display at least one other indication corresponding to the at least one of the plurality of other users which corresponds to the particular request to filter data, wherein the at least one other indication is shown distanced from the first indication based on the determined relationship strength.

* * * * *